(12) United States Patent
Kumada et al.

(10) Patent No.: US 6,459,436 B1
(45) Date of Patent: Oct. 1, 2002

(54) IMAGE PROCESSING METHOD AND APPARATUS

(75) Inventors: Shuichi Kumada; Manabu Ohga, both of Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/437,322

(22) Filed: Nov. 10, 1999

(30) Foreign Application Priority Data

Nov. 11, 1998 (JP) .......................................... 10-320952

(51) Int. Cl.$^7$ .............................. H04N 1/60; G09G 5/00; G09G 5/02; G09G 5/06
(52) U.S. Cl. ...................... 345/590; 345/589; 345/591; 345/604; 348/223; 348/602; 348/649; 348/655; 358/516; 358/518; 358/519; 358/520; 382/162; 382/167
(58) Field of Search ................................ 358/500, 522, 358/501, 504, 515, 516–518, 519–521; 348/223, 657, 658, 649–650, 655, 656, 675, 607, 624, 659, 674, 645, 600, 602, 722, 582, 603; 382/162–167, 171–173; 345/589–591, 593, 597, 600, 604–606, 617–620

(56) References Cited

U.S. PATENT DOCUMENTS

| | | | | |
|---|---|---|---|---|
| 5,208,911 A | * | 5/1993 | Newman et al. | 345/588 |
| 5,276,779 A | * | 1/1994 | Statt | 395/109 |
| 5,432,906 A | * | 7/1995 | Newman et al. | 382/302 |
| H1506 H | * | 12/1995 | Beretta | 345/199 |
| 5,532,848 A | * | 7/1996 | Beretta | 358/540 |
| 5,583,666 A | * | 12/1996 | Ellson et al. | 358/518 |
| 5,754,448 A | * | 5/1998 | Edge | 364/526 |
| 5,754,682 A | | 5/1998 | Katoh | 382/162 |
| 5,920,358 A | * | 7/1999 | Takemura | 348/665 |
| 6,157,735 A | * | 12/2000 | Holub | 382/167 |
| 6,225,974 B1 | * | 5/2001 | Mardsen et al. | 345/590 |
| 6,229,916 B1 | * | 5/2001 | Ohkubo | 382/167 |
| 6,243,059 B1 | * | 6/2001 | Greene | 345/88 |
| 6,249,315 B1 | * | 6/2001 | Holm | 348/251 |
| 6,340,975 B2 | * | 1/2002 | Mardsen et al. | 345/590 |

FOREIGN PATENT DOCUMENTS

| | | | | |
|---|---|---|---|---|
| JP | 7-222196 | | 8/1995 | ............ H04N/9/79 |
| JP | 9-093451 | | 4/1997 | ............ H04N/1/60 |
| JP | 9-102882 | | 4/1997 | ............ H04N/1/60 |
| JP | 9-219800 | | 8/1997 | ............ H04N/1/60 |
| JP | 10-215385 | | 8/1998 | ............ H04N/1/60 |
| JP | 11-055688 | | 2/1999 | ............ H04N/9/79 |
| JP | 02001309198 A | * | 2/2001 | ............ H04N/1/60 |

* cited by examiner

*Primary Examiner*—Matthew Luu
*Assistant Examiner*—Wesner Sajous
(74) *Attorney, Agent, or Firm*—Fitzpatrick, Cella, Harper & Scinto

(57) ABSTRACT

When gamut mapping (hue restoration) defined by one Lab color space is applied in color matching under different reference white points, human vision perceives the hue as inconsistent. In view of this, input data which is dependent on a color space of an input device is converted by a first conversion LUT to color space data which is independent of any devices, based on a viewing condition at the time of viewing an input original. The device independent data is converted to data in the human color perception space by a forward converter, subjected to gamut mapping, and converted back to device independent data in the color space independent of any devices by an inverse converter, based on a viewing condition at the time of viewing an output original. Then, the device independent data is converted to output data in a color space which is dependent on an output device by a second conversion LUT.

11 Claims, 19 Drawing Sheets

FIG. 19

| INPUT VIEWING CONDITION | | OUTPUT VIEWING CONDITION | |
|---|---|---|---|
| VIEWING SUBJECT: | MONITOR ▼ 213 | VIEWING SUBJECT: | PRINTOUT ▼ 217 |
| LUMINANCE: | 90 cd/m² 214 | LUMINANCE: | 200 cd/m² 218 |
| ILLUMINANT: | D93 ▼ 215 | ILLUMINANT: | F2 ▼ 219 |
| AMBIENT LIGHT: | DARK ▼ 216 | AMBIENT LIGHT: | AVERAGE ▼ 2110 |

CHROMATIC ADAPTABILITY ADJUSTMENT

BALANCE: 0.7   2111

BACK TO STANDARD   2112

OK    CANCEL

IMAGE PROCESSING METHOD AND APPARATUS

BACKGROUND OF THE INVENTION

The present invention relates to an image processing method and apparatus, and more particularly, to an image processing method and apparatus for performing color matching according to ambient light.

FIG. 1 is a conceptual view of general color matching.

Input RGB data is converted by an input profile to XYZ data of a color space which does not depend on any devices. Since an output device cannot express colors outside the color reproduction range of the output device, gamut mapping is performed on the inputted data, which has been converted to the data in the device-independent color space, such that all colors of the inputted data fall within the color reproduction range of the output device. After the gamut mapping is performed, the inputted data is converted from the device-independent color space to CMYK data of a color space which is dependent on the output device.

In color matching, a reference white point and ambient light are fixed. For instance, according to a profile specified by the International Color Consortium (ICC), Profile Connection Space (PCS) for associating profiles uses XYZ values or Lab values based on a D50 characteristic. Therefore, correct color reproduction is guaranteed when an inputted original document and a printout are viewed under an illuminant of the D50 characteristic. Under an illuminant of other characteristics, correct color reproduction is not guaranteed.

When a sample (e.g., an image) is viewed under different illuminants, XYZ values of the viewed sample naturally vary. The XYZ values under various illuminants are predicted by conversion methods such as (1) ratio conversion, (2) Von Kries conversion, and (3) prediction formula using a color perception model.

In the ratio conversion method, XYZ values under a reference white point W1 are converted to XYZ values under a reference white point W2 at a ratio of W2/W1. If this conversion method is applied to the Lab uniform color space, the Lab values under W1 become equal to the Lab values under W2. Assuming that XYZ values of a sample under W1(Xw1, Yw1, Zw1) are (X1, Y1, Z1) and XYZ values of the sample under W2(Xw2, Yw2, Zw2) are (X2, Y2, Z2), the following relations are obtained by the ratio conversion:

$$X2 = \frac{Xw2}{Xw1} X1 \\ Y2 = \frac{Yw2}{Yw1} Y1 \\ Z2 = \frac{Zw2}{Zw1} Z1 \quad (1)$$

According to the Von Kries conversion, XYZ values under the reference white point W1 are converted to XYZ values under the reference white point W2 at a ratio of W2'/W1' in a human color perception space PQR. If this conversion method is applied to the Lab uniform color space, the Lab values under W1 do not become equal to the Lab values under W2. Assuming that XYZ values of a sample under W1(Xw1, Yw1, Zw1) are (X1, Y1, Z1) and XYZ values of the sample under W2(Xw2, Yw2, Zw2) are (X2, Y2, Z2), the following relations are obtained by Von Kries conversion:

$$\begin{bmatrix} X2 \\ Y2 \\ Z2 \end{bmatrix} = [\text{inv\_Mat}] \begin{bmatrix} \frac{Pw2}{Pw1} & 0 & 0 \\ 0 & \frac{Qw2}{Qw1} & 0 \\ 0 & 0 & \frac{Rw2}{Rw1} \end{bmatrix} [Mat] \begin{bmatrix} X1 \\ Y1 \\ Z1 \end{bmatrix} \quad (2)$$

where $$\begin{bmatrix} Pw2 \\ Qw2 \\ Rw2 \end{bmatrix} = [Mat] \begin{bmatrix} Xw2 \\ Yw2 \\ Zw2 \end{bmatrix} \quad (3)$$

$$\begin{bmatrix} Pw1 \\ Qw1 \\ Rw1 \end{bmatrix} = [Mat] \begin{bmatrix} Xw1 \\ Yw1 \\ Zw1 \end{bmatrix} \quad (4)$$

$$[\text{inv\_Mat}] = \begin{bmatrix} 1.85995 & -1.12939 & 0.21990 \\ 0.36119 & 0.63881 & 0 \\ 0 & 0 & 1.08906 \end{bmatrix} \quad (5)$$

$$[Mat] = \begin{bmatrix} 0.44024 & 0.70760 & -0.08081 \\ -0.22630 & 1.16532 & 0.04570 \\ 0 & 0 & 0.91822 \end{bmatrix} \quad (6)$$

To convert XYZ values under a viewing condition VC1 (including W1) to XYZ values under a viewing condition VC2 (including W2), the prediction formula using a color perception model, which is a conversion method such as CIE CAM 97s using the human color perception space QMH (or JCH) is employed. Herein, Q for QMH represents brightness, M represents colorfulness, and H represents hue quadrature or hue angle. J for JCH represents lightness, C represents chroma, and H represents hue quadrature or hue angle. If this conversion method is applied to the Lab uniform color space, the Lab values under W1 are not equal to the Lab values under W2, similarly to the case of the Von Kries conversion. Assuming that XYZ values of a sample under W1(Xw1, Yw1, Zw1) are (X1, Y1, Z1) and XYZ values of the sample under W2(Xw2, Yw2, Zw2) are (X2, Y2, Z2), the prediction formula using color appearance model performs the following conversion:

(X1, Y1, Z1)→[forward conversion of CIE CAM97s]→(Q, M, H) or (J, C, H)→[inverse conversion of CIE CAM97s] (X2, Y2, Z2)

In other words, if it is assumed that XYZ values under a reference white point which varies depending on a ratio conversion can be converted, the contour lines of hue in the Lab color spaces under various reference white points are always the same. However, if human color perception is taken into consideration, such as in the Von Kries conversion or prediction formula using a color perception model, the contour lines of hue in the Lab color spaces under different reference white points vary depending on the reference white points.

For the above reason, if gamut mapping (hue restoration) defined under one Lab color space is applied to color matching under different reference white points, the human vision perceives the hue as inconsistent.

Moreover, in the current ICC profile, since the PCS is limited to XYZ values or Lab values based on the D50 characteristic, color matching corresponding to ambient light cannot be performed.

SUMMARY OF THE INVENTION

The present invention is made in consideration of the above situation, and has as its object to provide an image processing method and apparatus for realizing excellent color reproduction regardless of viewing conditions.

Another object of the present invention is to provide an image processing method and apparatus for realizing excellent color reproduction particularly by performing partial adaptation processing.

Furthermore, another object of the present invention is to provide an image processing method and apparatus which enable adjustment of partial adaptation processing so as to adjust chromatic adaptability processing to obtain a result desired by a user.

In order to attain the above objects, the present invention provides an image processing method for performing chromatic adaptability conversion processing on input image data based on a viewing condition, wherein the chromatic adaptability conversion processing performs partial adaptation processing in accordance with ambient light and an illuminant, and at least one parameter of the partial adaptation processing can be adjusted.

Furthermore, in order to attain the above objects, the present invention provides an image processing apparatus comprising conversion means for at least performing chromatic adaptability conversion processing on input image data based on a viewing condition, wherein the chromatic adaptability conversion processing performs partial adaptation processing in accordance with ambient light and an illuminant, and at least one parameter of the partial adaptation processing can be adjusted.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 19 shows an example of a GUI (graphic user interface).

DETAILED DESCRIPTION OF THE PREFERRED EMBODIMENTS

Preferred embodiments of the image processing method and apparatus according to the present invention will be described in detail-with reference to the accompanying drawings.

First, a color perception model used in the following embodiments is described with reference to FIGS. 17 and 18.

A color perceived by a human visual system is different depending on conditions, such as the difference in lighting or a background on which a stimulus as a viewing subject is placed, even if the characteristic of light entering the eye is the same.

For instance, a white color, illuminated by an incandescent lamp, is not perceived as red as the characteristic of light entering the eye, but is perceived as white. A white color placed on a black background is perceived brighter than a white color placed on a bright background. The former phenomenon is known as chromatic adaptation and the latter is known as a contrast. In view of this, colors must be displayed not by the XYZ color system, but by a value corresponding to a physiological activity level of visual cells distributed on the retina. For this purpose, a color perception model has been developed. The CIE (Commission Internationale de l'Eclairage) recommends using the CIE CAM97s. This color perception model utilizes color perception correlation values, which are H (hue), J (lightness) and C (chroma), or H (hue), Q (brightness) and M (colorfulness), as three physiological primary colors of color vision, and is considered as a color display method which does not depend upon viewing conditions. By reproducing colors so as to match the values of H, J and C or H, Q and M between devices, it is possible to solve the problem of different viewing conditions in an input image and output image.

[Forward Conversion Processing]

Figure 17:
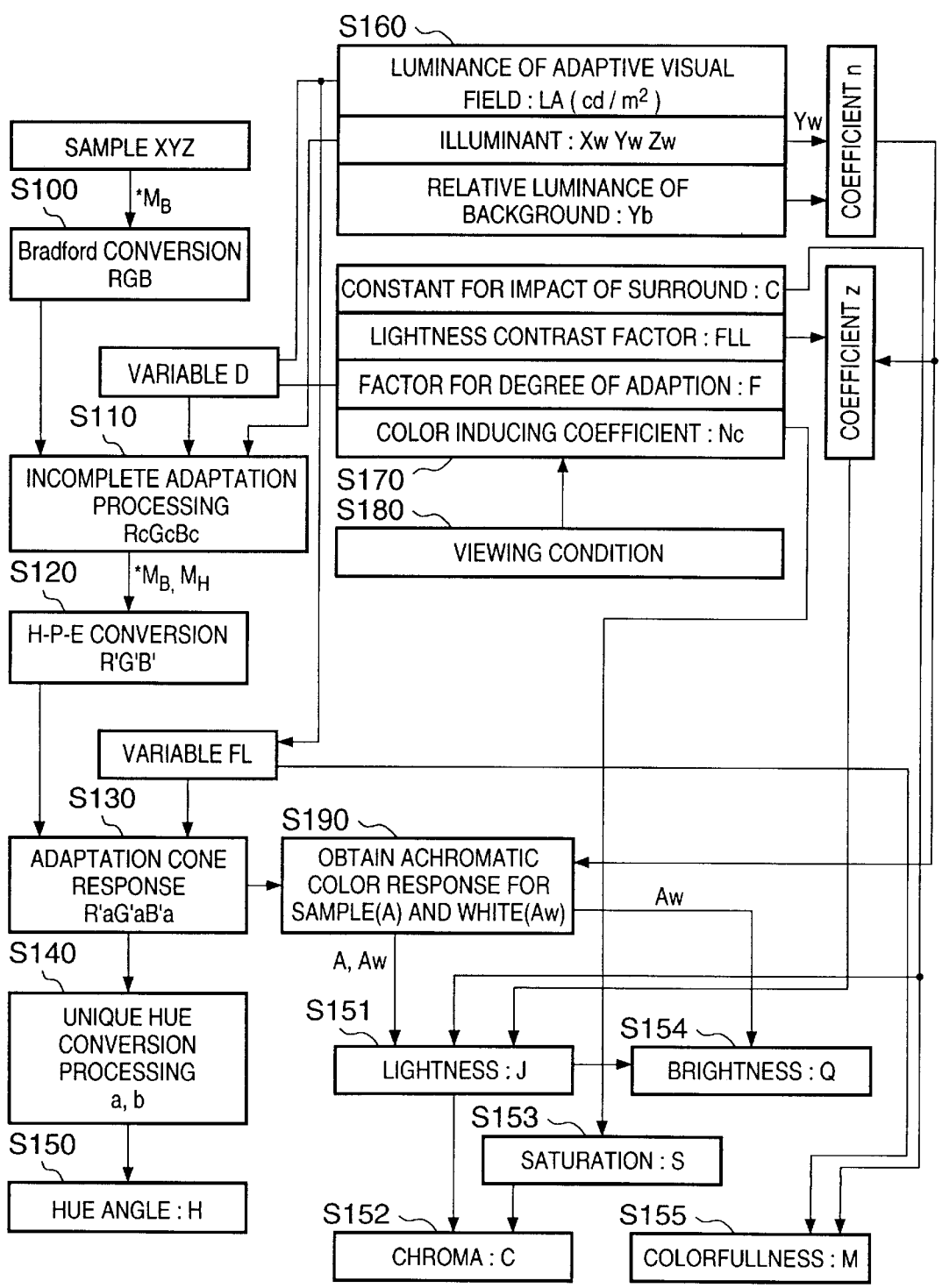
FIG. 17 is an explanatory block diagram of a color perception model used in the embodiments of the present invention.

Description will be provided with reference to FIG. 17 for the processing of forward conversion of the color perception model CIE CAM97s, for performing correction processing (conversion from XYZ to JCH or QMH) in accordance with a viewing condition at the time of viewing an image to be inputted.

In step S160, LA indicative of a luminance of an adaptive visual field (cd/m$^2$) (normally, 20% of white luminance in the adaptive visual field is selected), XYZ indicative of relative tristimulus values of a sample under an illuminant condition, XwYwZw indicative of relative tristimulus values of a white light under the illuminant condition, and Yb indicative of a relative luminance of a background under the illuminant condition are set as the viewing condition information of an image to be inputted. Based on the type of viewing condition specified in step S180, a constant c indicative of an ambient influence, a color inducing coefficient Nc, a lightness contrast coefficient FLL, and an adaptability coefficient F are set as the viewing condition information of the input image in step S170.

Based on the input image viewing condition information set in steps S160 and S170, the following processing is performed on the XYZ representing an input image.

First, the XYZ are converted based on Bradford's three primary colors, which are considered as three human physiological primary colors, to obtain RGB corresponding to Bradford's cone response (step S100). Since human vision does not always completely adapt to the viewing illuminant, a variable D indicative of adaptability is obtained based on a luminance level and an ambient condition (LA and F). Based on the obtained variable D and XwYwZw, incomplete adaptation processing is performed on RGB to be converted to RcGcBc (step S110).

Next, RcGcBc is converted based on Hunt-Pointer-Estevez's three primary colors, which are considered as three human physiological primary colors, to obtain R'G'B' corresponding to Hunt-Pointer-Estevez's cone response (step S120). The adaptability of R'G'B' is estimated by a stimulus intensity level to obtain R'aG'aB'a corresponding to an adapted cone response which corresponds to both the sample and white (step S130). Note that in step S130, nonlinear response compression is performed by using a variable FL which is calculated based on the luminance LA of the adaptive visual field.

Then, to obtain the correlation between a color perception and the XYZ, the following processing is performed.

Opposite color responses a and b of red-green and yellow-blue are calculated from R'aG'aB'a (step S140), and a hue H is calculated from the opposite color responses a and b and an eccentricity factor (step S150).

Then, a background inducing coefficient n is calculated from Yw and the relative luminance Yb of the background. By using the background inducing coefficient n, achromatic color responses A and Aw with respect to both the sample and white are calculated (step S190). Lightness J is calculated by using a coefficient z, calculated from the background inducing coefficient n and lightness contrast coefficient FLL, and the achromatic color responses A and Aw as well as the ambient influence constant c (step S151). A saturation S is calculated from the color inducing coefficient Nc (step S153), then from the saturation S and lightness J, a chroma C is calculated (step S152), and a brightness Q is calculated from the lightness J and achromatic color response Aw for white (step S154).

A colorfulness M is calculated from the variable FL and ambient influence constant c (step S155).

[Inverse Conversion Processing]

Figure 1:
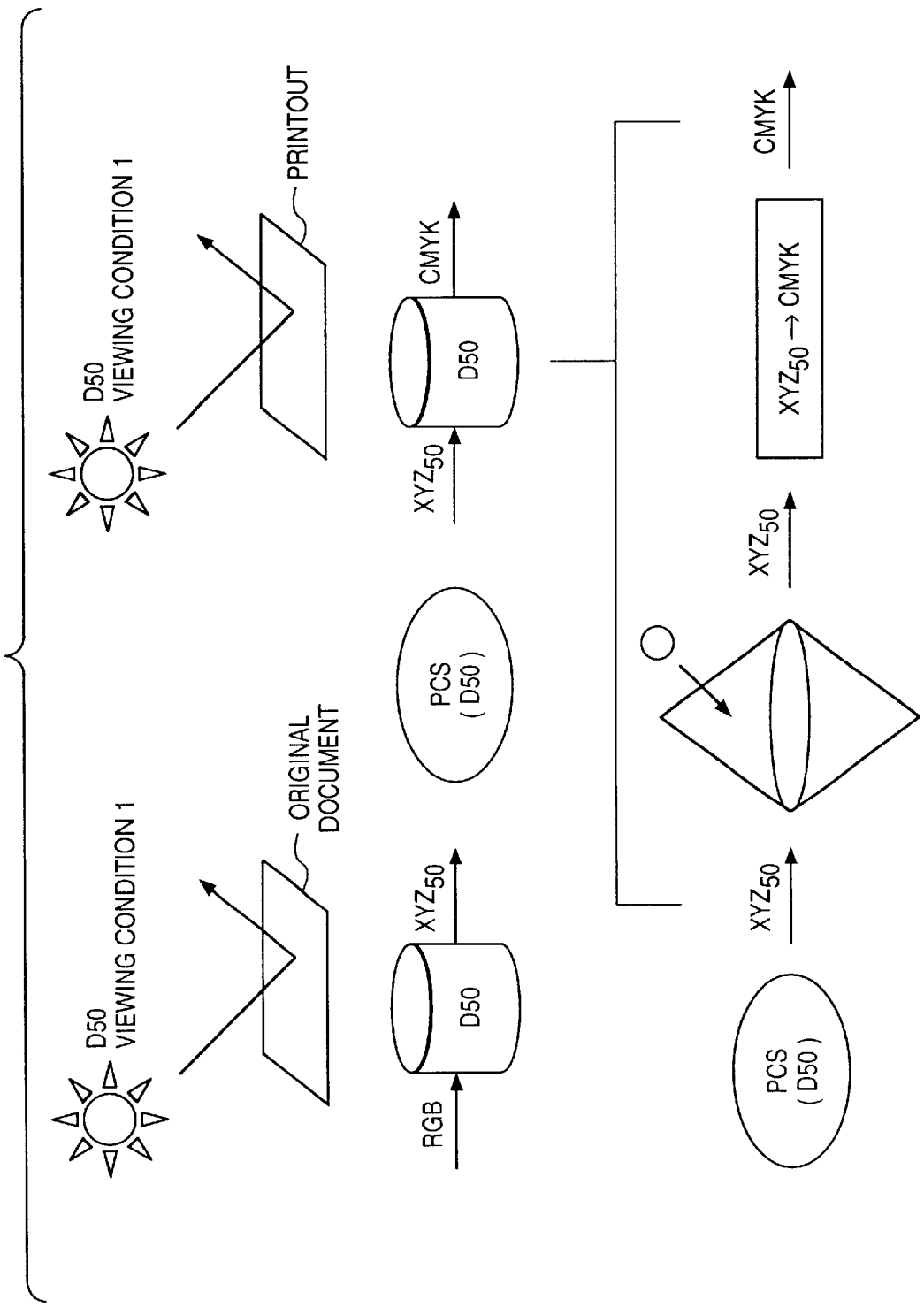
FIG. 1 is a conceptual view of color matching.
Figure 2:
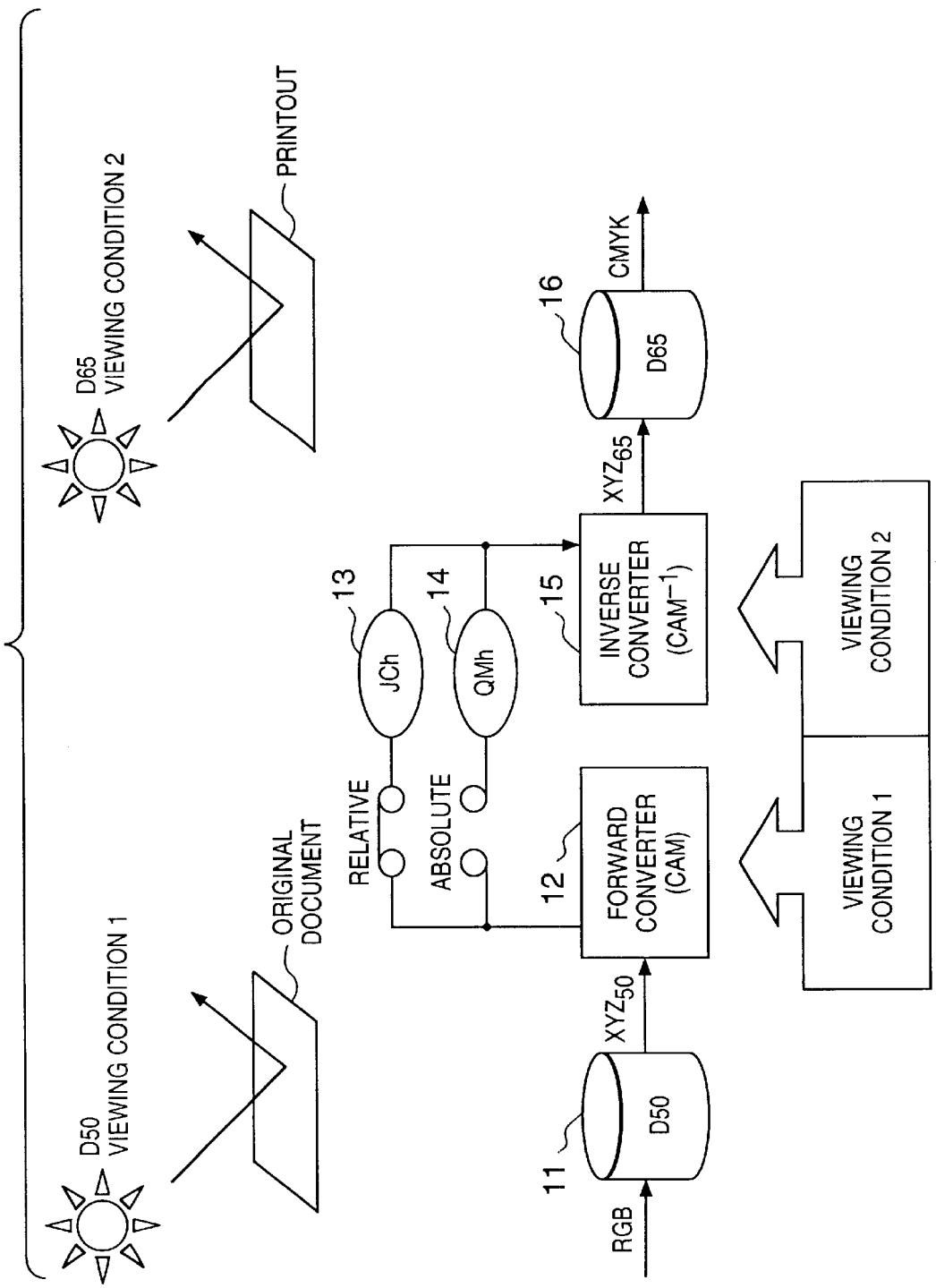
FIG. 2 is an explanatory view showing a concept of the present invention.
Figure 18:
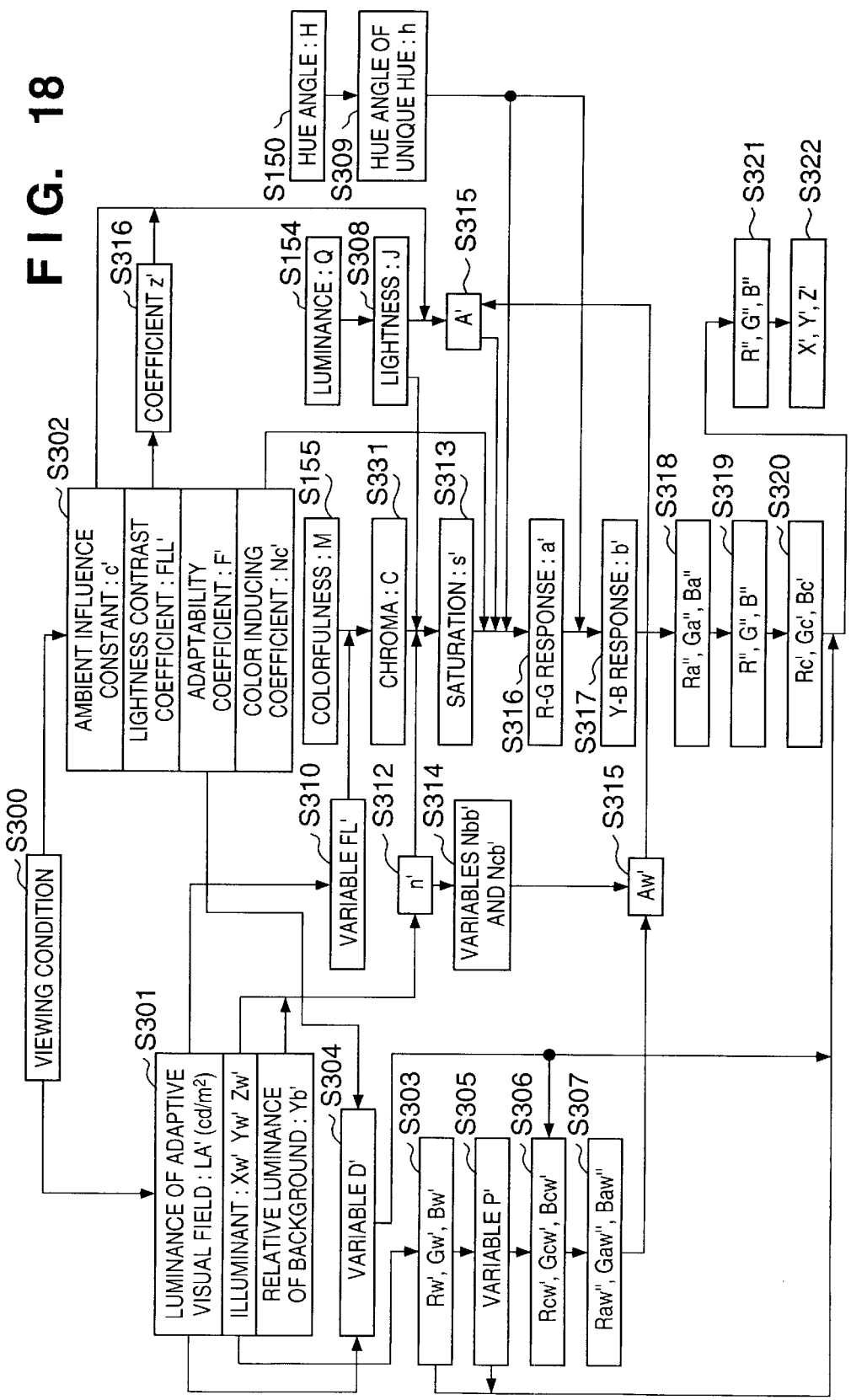
FIG. 18 is a block diagram showing inverse conversion processing performed by an inverse converter 15 shown in FIG. 2 in a case of using CIE CAM97s.

Inverse conversion processing performed by the inverse converter 15 shown in FIG. 2 in the case of employing CIE CAM97s is shown in FIG. 18.

In FIG. 18, X'Y'z' which is an XYZ value in an output viewing condition corresponding to the sample XYZ mentioned in FIG. 17 is obtained based on the values of H (hue), j (lightness) and C (chroma), or H (hue), Q (brightness) and M (colorfulness) which are the color perception correlation values obtained by the processing shown in FIG. 17. Note that in FIG. 18, for the purpose of simplifying the drawing, arrows indicative of processing related to each of the coefficients are partially omitted.

First, as viewing condition data of an output image which is specified in step S300, LA' indicative of a luminance of an adaptive visual field (normally selected is 20% of the luminance of white in the adaptive visual field), Xw'Yw'Zw' indicative of a relative tristimulus value of a white light under an illuminant condition, and Yb' indicative of a relative luminance of a background under the illuminant condition are set in step S301. Furthermore, based on the type of viewing condition specified in step S300, a constant c' indicative of an ambient influence, a color inducing coefficient Nc', lightness contrast coefficient FLL', and an adaptability coefficient F' are set in step S302 as the viewing condition data of an input image.

The XYZ are converted based on Bradford's three primary colors, which are considered as three human physiological primary colors, to obtain Bradford's cone response Rw'Gw'Bw' corresponding to Xw'Yw'Zw' indicative of a relative tristimulus value of white light (step S303).

Since human vision does not always completely adapt to the viewing illuminant, a variable D' indicative of adaptability is obtained based on a luminance level and an ambient condition (LA' and F') (step S304), and also a variable P' is obtained based on the value of Bw' (step S305). Rcw'Gcw'Bcw' is obtained based on the obtained variables D' and P' as well as Rw'Gw'Bw' (step S306).

Next, Rcw'Gcw'Bcw' is converted to XYZ based on Hunt-Pointer-Estevez's three primary colors, and Hunt-Pointer-Estevez's cone response is obtained. The adaptability to the Hunt-Pointer-Estevez's cone response is estimated according to the stimulus intensity level, and an adapted cone response Raw"Gaw"Baw" of white is obtained (step S307).

Next, lightness J is obtained based on the brightness Q obtained in step S154 (step S308), and then a hue angle h of a unique hue is obtained based on the hue angle H obtained in step S150 (step S309). Further, based on the luminance LA' of an adaptive visual field obtained in step S301, variable FL' is obtained (step S310), and based on the variable FL' and colorfulness M obtained in step S155, chroma C is obtained (step S311).

Then, background inducing coefficient n' is obtained from Yw' and background relative luminance Yb' obtained in step S301 (step S312). Then, saturation s' is obtained from the background inducing coefficient n' obtained in step S312, chroma C obtained in step S331, and lightness J obtained in step S308 (step S313). Further, from the background inducing coefficient n' obtained in step S312, variables Nbb' and Ncb' are obtained (step S314), and from the variable Nbb' and Raw"Gaw"Baw" obtained in step S307, achromatic color response Aw' for white is obtained (step S315).

Furthermore, a coefficient z' is obtained from the lightness contrast coefficient FLL' obtained in step S302 (step S316). An achromatic color response A' is determined from the coefficient z', constant c' indicative of an ambient influence obtained in step S302, achromatic color response Aw' for white obtained in step S315, and lightness J obtained in step S308 (step S315). An opposite color response a' of red-green is obtained from the achromatic color response A', color inducing coefficient Nc' obtained in step S302, saturation s' obtained in step S313, hue angle h obtained in step S309, and variables Nbb' and Ncb' obtained in step S314 (step S316), and based on the opposite color response a' of red-green obtained in step S316 and hue angle h obtained in step S309, an opposite color response b' of yellow-blue is obtained (step S317). Then, an adapted cone response Ra"Ga"Ba" is obtained from the opposite color responses a' and b', variable Nbb' obtained in step S314, and achromatic color response A' obtained in step S315 (step S318).

Next, R"G"B" corresponding to the Hunt-Pointer-Estevez's cone response is obtained from the adapted cone response Ra"Ga"Ba" (step S319). Rc'Gc'Bc' is obtained from the R"G"B" obtained in step S319 and variable FL' obtained in step S310 (step S320). From the Rc'Gc'Bc' obtained in step S320, variable D' obtained in step S304, variable P' obtained in step S305, and Rw'Gw'Bw' obtained in step S303, Bradford's cone response R"G"B" is obtained (step S321). Then, from the R"G"B" obtained in step S321, X'Y'Z' in an output viewing condition, which corresponds to the sample XYZ is determined (step S322).

First Embodiment

Description is provided for the first embodiment in which a profile is dynamically changed in accordance with a viewing condition.

Referring to FIG. 2, reference numeral 11 denotes a conversion matrix or a conversion lookup table (LUT) for converting data which is dependent on an input device (hereinafter referred to as input-device-dependent data) to data of the device-independent color space (hereinafter referred to as input-independent data), which accords to a white point of ambient light at the time of viewing an image formed on an original. Reference numeral 12 denotes a forward converter (CAM) of a color perception model for converting data, obtained from the conversion LUT 11, to human color perception color space JCh or QMh. Reference numeral 13 denotes a relative color perception space JCh (or JCH) relative to the reference white of an ambient light; and 14, an absolute color perception space QMh (or QMH) whose size changes in accordance with an illuminance level. Reference numeral 15 denotes an inverse converter of a color perception model for converting data of the human's color perception space JCh or QMh to data of the device independent color space (hereinafter referred to as output-independent data), which accords to a white point of ambient light at the time of viewing an image formed on a printout. Reference numeral 16 denotes a conversion LUT for converting data, obtained from the inverse converter 15, to data which is dependent on an output device (hereinafter referred to as output-device-dependent data).

Generally, the white point of ambient light under a viewing condition is different from a white point of the standard illuminant at the time of colorimetry of a color target or color patch or the like. For instance, the standard illuminant used at the time of colorimetry is D50 or D65, but ambient light for actually viewing an image is not always D50 or D65 in a light booth. An illumination light from an incandescent lamp or fluorescent light, or a combination of illumination light and sunlight are often used as ambient light in which the image is actually viewed. In the following description, although an illuminant characteristic of ambient light under a viewing condition is assumed as D50, D65 and D93 to simplify the description, in reality, XYZ values of a white point on a medium is set as a white point.

Figure 3:
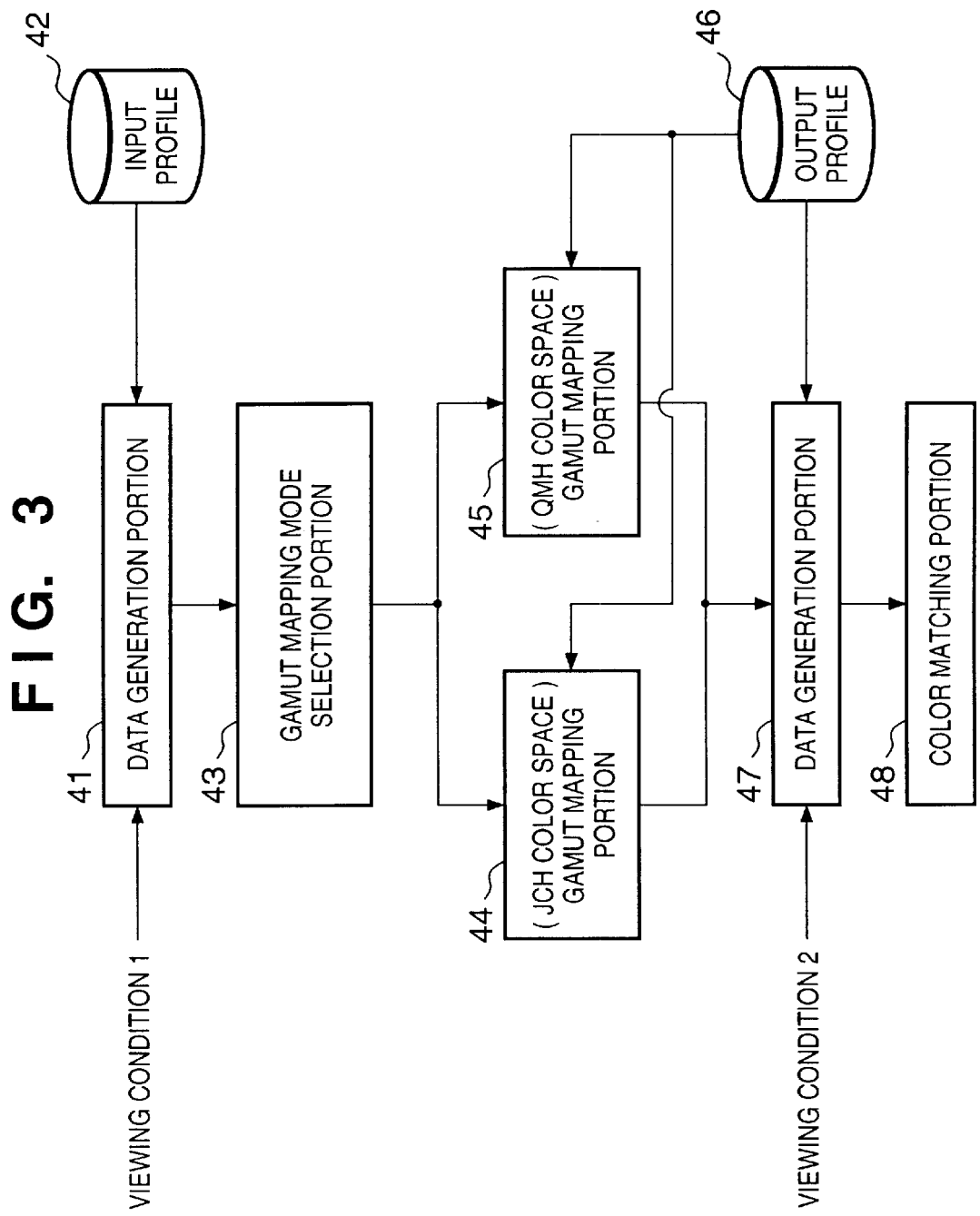
FIG. 3 is a block diagram showing the functional configuration of a first embodiment of the present invention.

FIG. 3 is a block diagram showing a functional configuration of the present embodiment. In FIG. 3, reference numeral 41 denotes a data generation portion for generating data, which is dependent on the viewing condition 1 of a data input side, based on an input profile 42 and the viewing condition 1. Reference numeral 43 denotes a gamut mapping mode selection portion for selecting whether the gamut mapping is performed in the JCH color perception space or in the QMH color perception space in accordance with designation by a user or designation by the profile. Reference numerals 44 and 45 denote gamut mapping portions respectively for performing gamut mapping on data in the JCH or QMH color perception space in accordance with an output profile 46. Reference numeral 47 denotes a data generation portion for generating data, which is dependent on a viewing condition 2 of an image output side, based on the output profile 46 and viewing condition 2. Reference numeral 48 denotes a color matching portion for performing color matching by utilizing the data which is dependent on the viewing condition 1, the gamut mapped data, the data which is dependent on the viewing condition 2, and color perception model.

Figure 16:
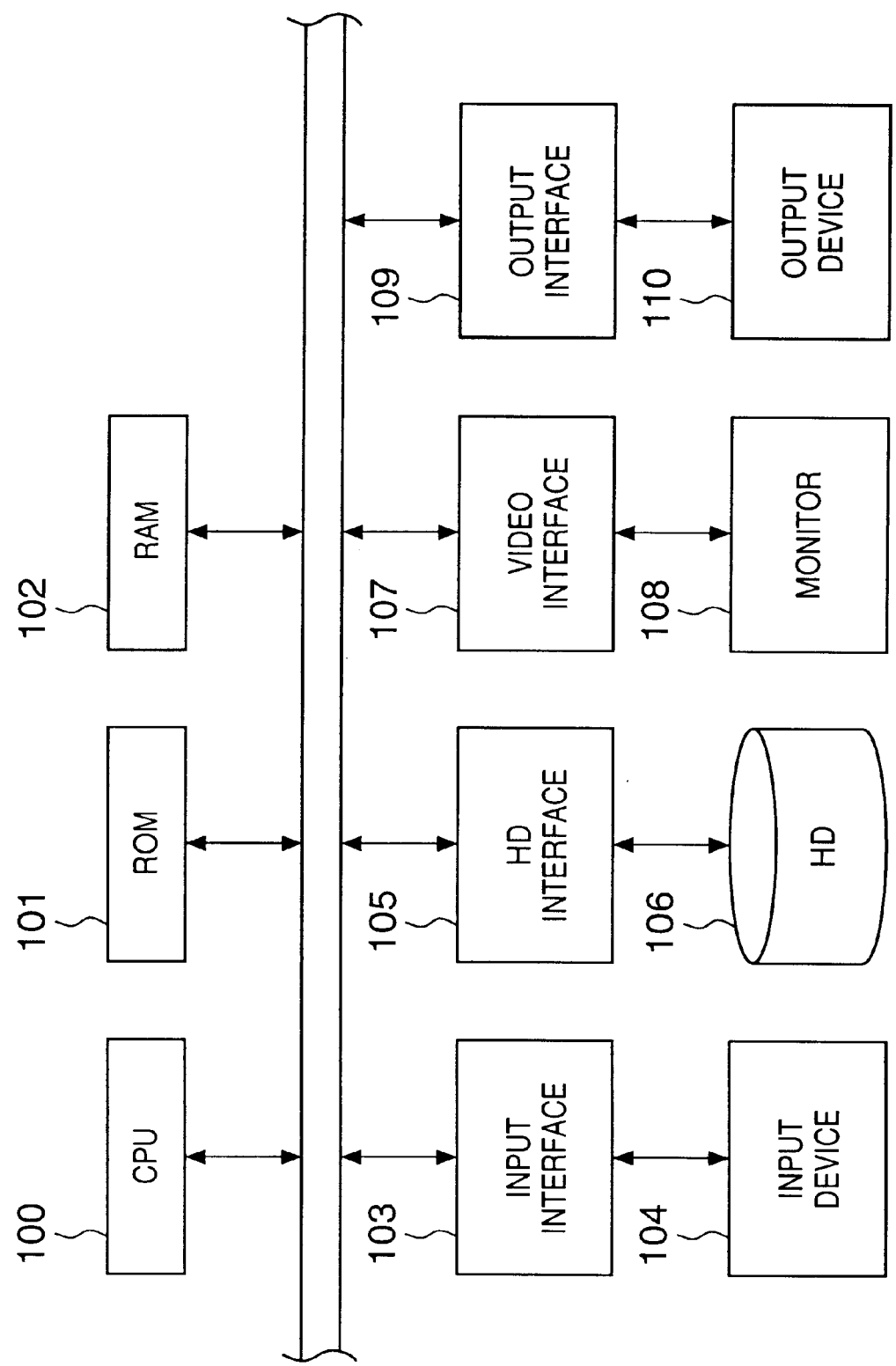
FIG. 16 is a block diagram showing a construction of an apparatus which realizes the functional configuration shown in FIG. 3.

FIG. 16 is a block diagram showing a construction of an apparatus which realizes the functional configuration shown in FIG. 3. It goes without saying that the apparatus shown in FIG. 16 is realized by supplying a general computer apparatus, such as a personal computer or the like, with software which realizes the function shown in FIG. 3. In this case, the software which realizes the function of the present embodiment may be included in the Operating System (OS) which is the basic system software of the computer apparatus, or may be provided, for instance, as a driver software of an input/output device independently of the OS.

In FIG. 16, a CPU 100 controls operation of the entire apparatus according to a program stored in a ROM 101 and hard disk (HD) 106 and the like, by utilizing a RAM 102 as a work memory, and executes various processing including the processing related to the above-described color matching. An input interface 103 is provided to connect an input device 104; a hard disk interface 105 is provided to connect the HD 106; a video interface 107 is provided to connect a monitor 108; and an output interface 109 is provided to connect an output device 110.

Note that the input device according to the present embodiment includes an image sensing device such as a digital still camera or a digital video camera or the like, and various image input devices including an image reader such as an image scanner or film scanner or the like. The. output device according to the present embodiment includes a color monitor such as a CRT or LCD or the like, and an image output device such as a color printer or film recorder or the like.

A general interface is utilized as the interface of the present embodiment. Depending on the usage purpose, a serial interface such as RS232C, RS422 or the like, a serial bus interface such as IEEE 1394, Universal Serial Bus (USB) or the like, and a parallel interface such as SCSI, GPIB, centronics or the like, are applicable.

Input/output profiles for color matching are stored in the HD 106. However, the storage medium is not limited to hard disk, but may be an optical disk such as a magneto-optical disk (MO) or the like.

Hereinafter, description is provided for an example of performing color matching by using the input/output profiles.

[Generating Data Dependent on Viewing Condition 1]

The conversion LUT 11 (FIG. 2) is generated by the data generation portion 41 (FIG. 3). Methods of generating the conversion LUT 11 include: a method of reconstructing the conversion LUT 11 so as to correspond to an ambient light, based on a relation between XYZ values (or Lab values) of a color target and RGB values of an input device as shown in FIG. 4; and a method of updating a conversion LUT stored in the input profile 42, which is provided for converting an RGB space dependent on a device to XYZ color space, to the conversion LUT 11 which corresponds to the ambient light.

Figure 4:
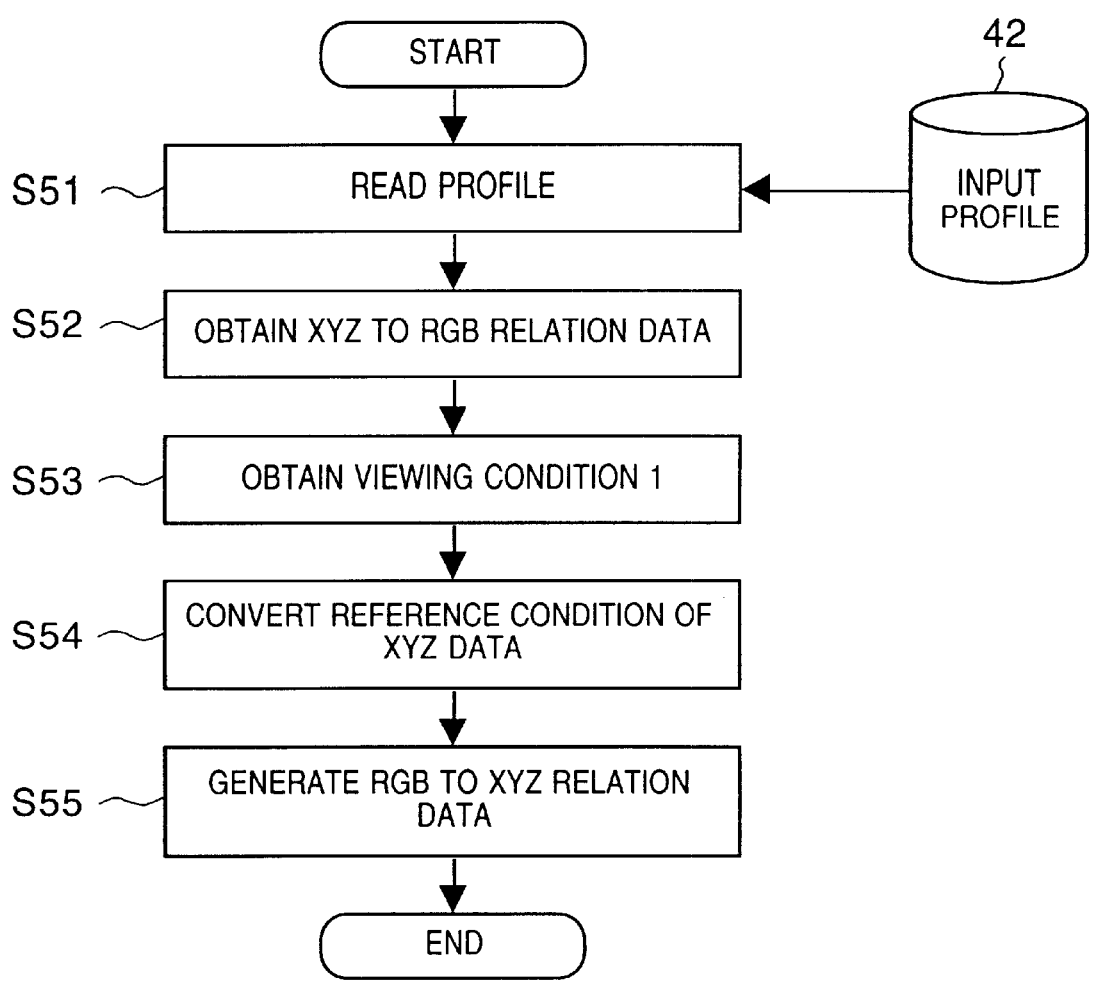
FIG. 4 is a flowchart showing the process of reconstructing a conversion LUT which corresponds to ambient light.

FIG. 4 is a flowchart showing the process of reconstructing the conversion LUT 11 which corresponds to ambient light.

To reconstruct the conversion LUT 11 so as to correspond to ambient light, a profile designated by a user is read from the input profile 42 in step S51. XYZ values (or Lab values) of the color target and XYZ-to-RGB relation data, which associates the XYZ values with RGB values for a case of reading the color target by an input device, are stored in advance in the profile. The XYZ-to-RGB relation data is obtained from the profile in step S52. Since the profile includes a viewing condition 1, the viewing condition 1 is obtained from the profile in step S53.

The XYZ values of the XYZ-to-RGB relation data, obtained in step S52, employ as a reference, D50 or D65 indicative of a reference light at the time of colorimetry of the color target. Therefore, the XYZ values of the calorimetric illuminant reference must be corrected to XYZ values of an ambient light reference. In step S54, by using the color perception model, the XYZ values of the colorimetric illuminant reference are converted to the color perception space JCH based on a colorimetric condition, i.e., the white point of D50 illuminant, an illuminance level, and the state of ambient light, and then the converted values in the color perception space JCH are converted back to XYZ values based on the viewing condition 1 different from the colorimetric condition, e.g., the white point of D65 illuminant, an illuminance level, and the state of ambient light. By this, XYZ values of the ambient light reference are obtained. In the foregoing manner, the relation between XYZ values of the ambient light reference and device RGB values is obtained. In step S55, an RGB-to-XYZ conversion matrix is generated based on the RGB-to-XYZ relation data and optimized by repetition or the like, thereby obtaining the conversion LUT 11 which corresponds to the viewing condition 1.

Figure 5:
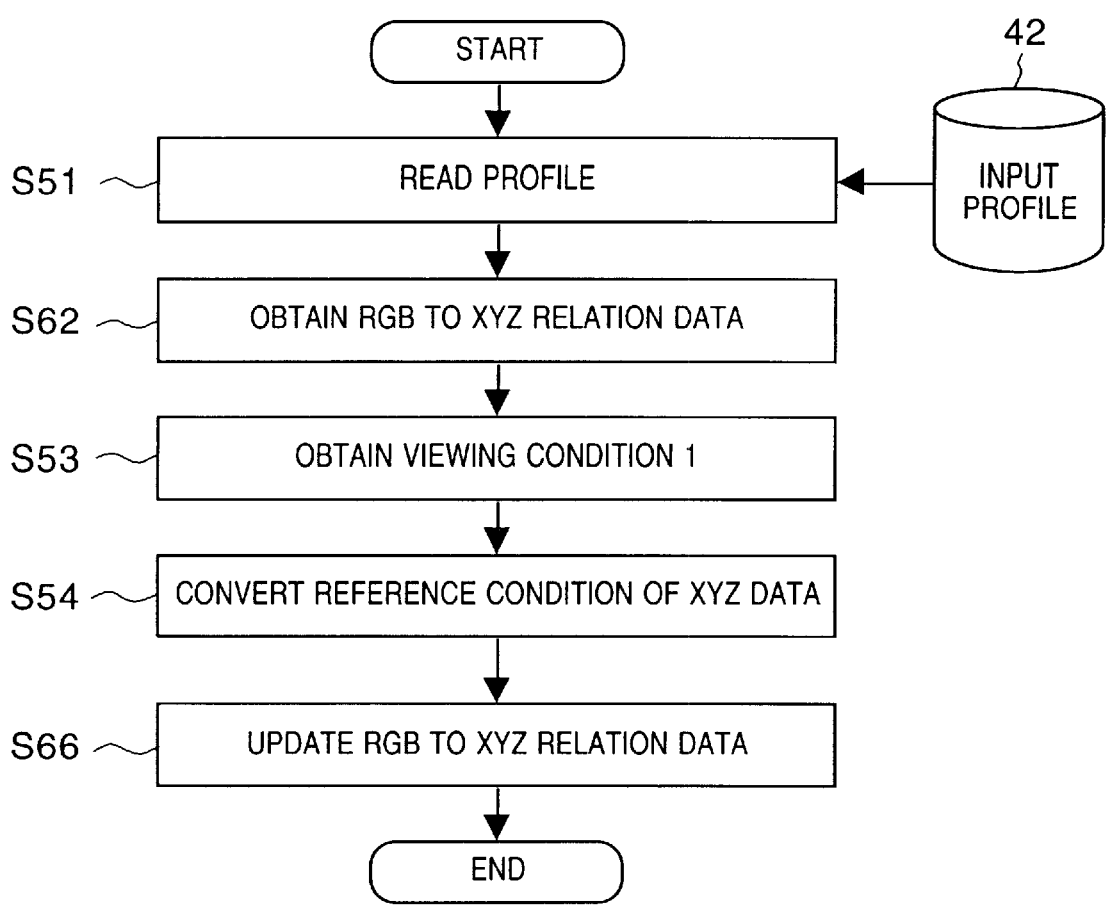
FIG. 5 is a flowchart showing the process of updating a conversion LUT so as to correspond to ambient light.

FIG. 5 is a flowchart showing the process of updating the conversion LUT, stored in the input profile 42, to the conversion LUT 11 which corresponds to an ambient light. Note that the steps in FIG. 5 executing the same processing as those in FIG. 4 have the same reference step number, and detailed description thereof is omitted.

Generally in the ICC profile for an input device, a conversion matrix (colorant Tag) for performing RGB-to-XYZ conversion, or a conversion LUT (AtoB0 Tag) is stored. Thus, the RGB-to-XYZ relation data is obtained from the profile in step S62.

In step S54, the relation between XYZ values of the ambient light reference and device RGB values is obtained. Then in step S66, the conversion matrix (colorant Tag) or conversion LUT (AtoB0 Tag) in the profile is updated. As a result, a conversion LUT, updated to the conversion LUT 11 corresponding to the viewing condition 1, is obtained.

Moreover, although FIGS. 4 and 5 provide an example of utilizing the RGB-to-XYZ relation data, the present invention is not limited to this, but may utilize other device-independent color data such as RGB-to-Lab relation data.

[Selecting Gamut Mapping Mode and Performing Gamut Mapping]

A gamut mapping mode is selected by a user through a user interface, or automatically selected by Rendering Intent included in the header of a source profile. The following selection is made in the automatic selection according to the profile.

Perceptual—gamut mapping mode in JCH color space
Relative Colorimetric—gamut mapping mode in JCH color space
Saturation—gamut mapping mode in JCH color space
Absolute Colorimetric—gamut mapping mode in QMH color space In other words, in a case of relative color matching, JCH space 13 is selected, while in a case of absolute color matching, QMH space 14 is selected.

Figure 6:
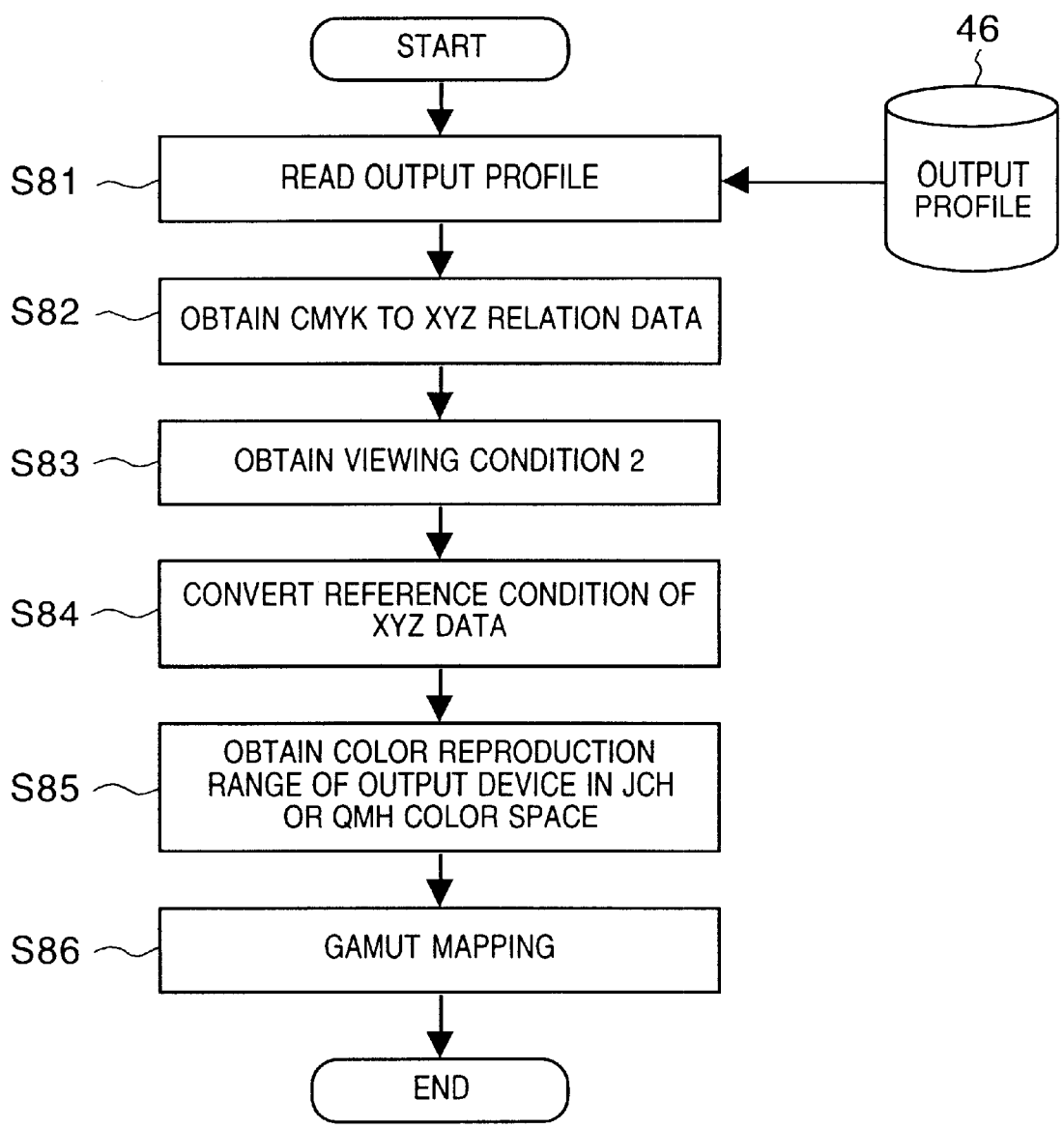
FIG. 6 is a flowchart showing the process of performing gamut mapping in the color space JCH or QMH.

FIG. 6 is a flowchart showing the process of performing the gamut mapping in the color perception space JCH 13 or color perception space QMH 14.

In order to perform the gamut mapping in a color perception space, a profile designated by a user is read from the output profile 46 in step S81.

Generally in an ICC profile for an output device, a judgment LUT (gamut Tag), to which XYZ values or Lab values are inputted, is stored in order to judge whether or not the input color values are inside or outside the color reproduction range (hereinafter referred to as inside/outside judgment of the color reproduction range) of the output device. However, because the XYZ values employ D50 or D65 which is the characteristic of calorimetric illuminant as a reference, the XYZ values cannot be directly used to make judgment of being inside/outside the color reproduction range of the output device according to ambient light. Therefore, instead of using the judgment LUT(gamut Tag) which judges being inside/outside the color reproduction range of the output device, CMYK-to-XYZ relation data is obtained in step S82 from the conversion LUT (AtoB0 Tag or the like), stored in the profile for CMYK-to-XYZ conversion. Since the profile includes the viewing condition 2, the viewing condition 2 is obtained from the profile in step S83.

The XYZ values of the CMYK-to-XYZ relation data, obtained in step S82, employ as a reference, D50 or D65 indicative of a colorimetric light. Therefore, the XYZ values of the calorimetric illuminant reference must be corrected to XYZ values of an ambient light reference. In step S84, by using the color perception model, the XYZ values of the calorimetric illuminant reference are converted to the color perception space JCH based on a colorimetric condition, i.e., the white point of D50 illuminant, an illuminance level, and the state of ambient light, and then the converted values in the color perception space JCH are converted back to XYZ values based on the viewing condition 2 different from the calorimetric condition, e.g., the white point of D65 illuminant, an illuminance level, and the state of ambient light. By this, XYZ values of the ambient light reference are obtained. In the foregoing manner, the relation between the device CMYK values and XYZ values of the ambient light reference is obtained in step S84. In step S85, a color reproduction range of an output device in the JCH or QMH color space is obtained based on the CMYK-to-ambient-light-XYZ relation data obtained in step S84.

The color reproduction range of an output device in the JCH or QMH color space is obtained as follows. XYZ values of an ambient light reference on the following eight points, shown as an example, are obtained by using the CMYK-to-ambient-light-XYZ relation data obtained in step S84.

Red (C:0%, M:100%, Y:100%, K:0%)
Yellow (C:0%, M:0%, Y:100%, K:0%)
Green (C:100%, M:0%, Y:100%, K:0%)
Cyan (C:100%, M:0%, Y:0%, K:0%)
Blue (C:100%, M:100%, Y:0%, K:0%)
Magenta (C:0%, M:100%, Y:0%, K:0%)
White (C:0%, M:0%, Y:0%, K:0%)
Black (C:0%, M:0%, Y:0%, K:100%)

Figure 7:
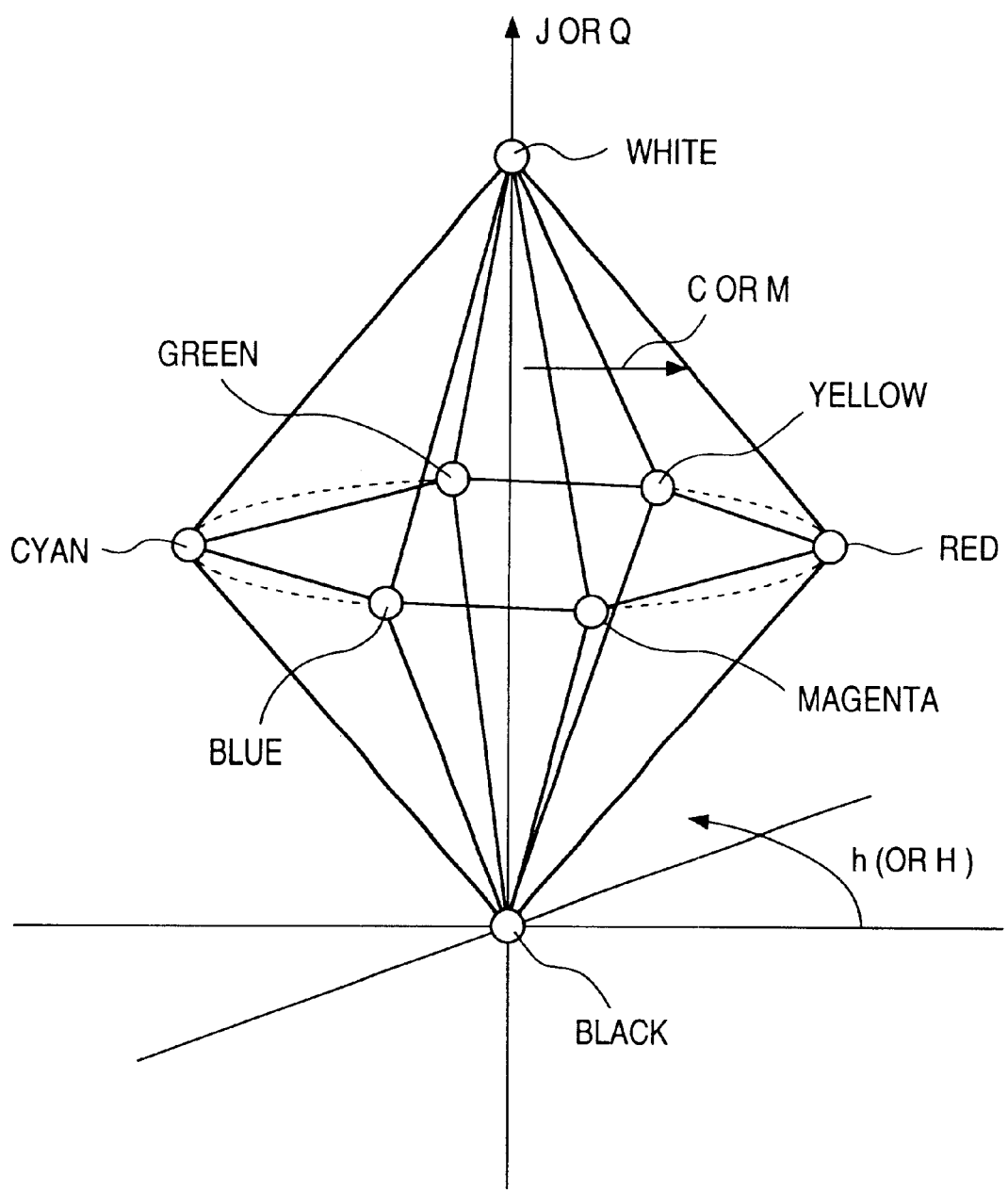
FIG. 7 shows a dodecahedron for approximating a color reproduction range.

Then, the obtained XYZ values are converted to coordinate values in the color perception space JCH or QMH based on the viewing condition 2 by using the color perception model. By this, the color reproduction range of the output device can be approximated by a dodecahedron shown in FIG. 7.

In the color reproduction range approximated by the dodecahedron, for instance, if an intermediate point between White and Black on an achromatic color axis and a point represented by JCH values or QMH values of an input color signal subjected to an inside/outside judgment exist in the same side, it is judged that the input color signal is inside the color reproduction range, while if these points exist in the opposite sides, it is judged that the input color signal is outside the color reproduction range.

Figure 8A:
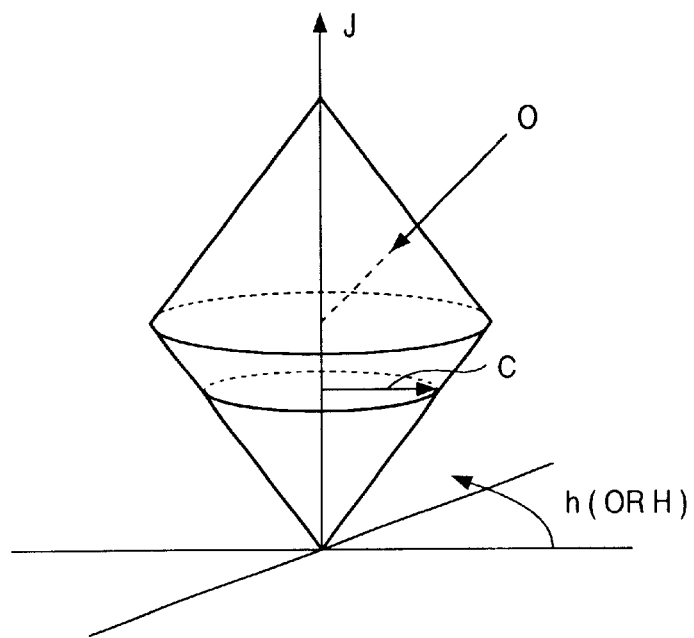
FIGS. 8A and 8B are conceptual views of gamut mapping in the JCH color perception space.
Figure 8B:
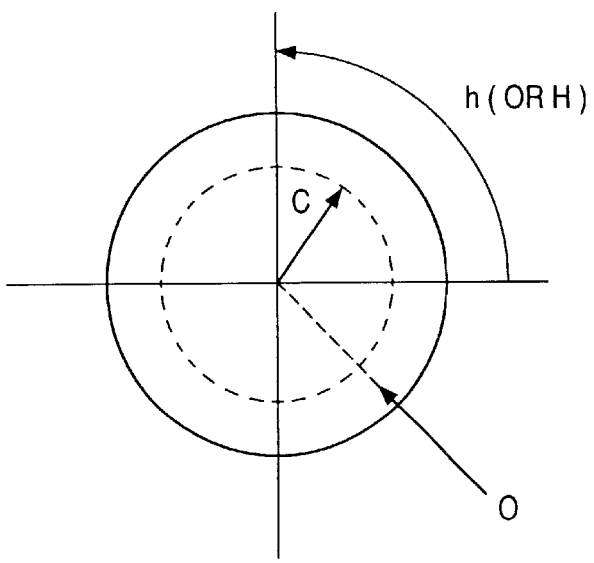
Figure 9A:
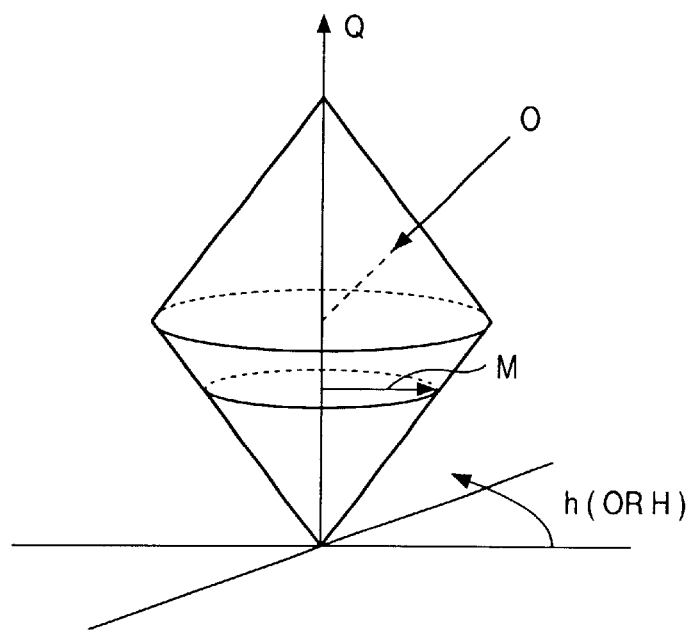
FIGS. 9A and 9B are conceptual views of gamut mapping in the QMH color perception space.
Figure 9B:
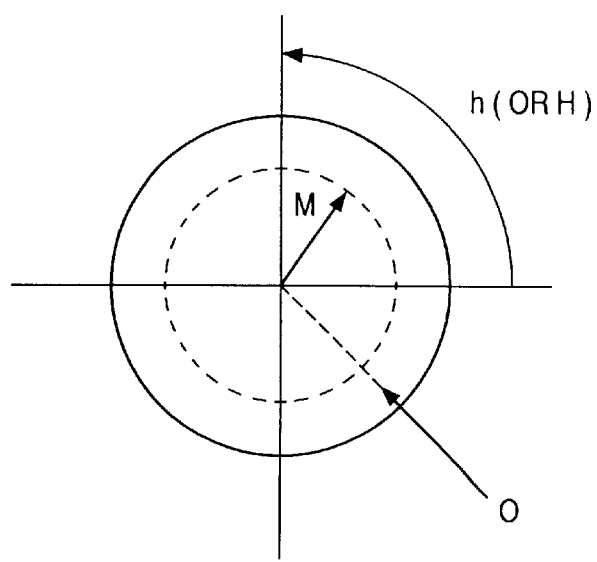

Based on the result of the inside/outside judgment of the color reproduction range in step S85, the gamut mapping is performed in step S86. FIGS. 8A and 8B are conceptual views of the gamut mapping in the JCH color perception space. FIGS. 9A and 9B are conceptual views of the gamut mapping in the QMH color perception space. If an input color signal is judged as being outside the color reproduction range of the output device in the aforementioned inside/outside judgment, the input color signal is mapped in the color reproduction range such that a hue angle h (or H) is preserved in the JCH color perception space or QMH color perception space. The mapping result is stored in the LUT for the JCH color perception space in a case of relative color matching, or stored in the LUT for the QMH color perception space in a case of absolute color matching.

Figure 10A:
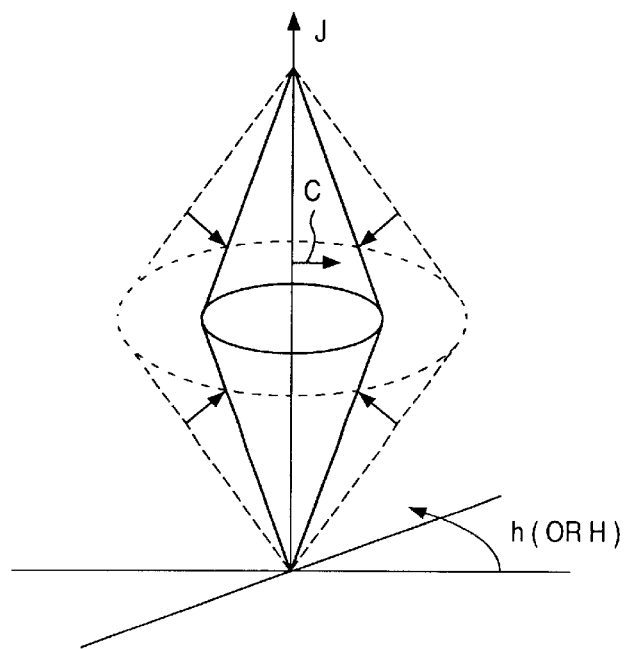
FIGS. 10A and 10B are conceptual views of gamut mapping performed between different devices.
Figure 10B:
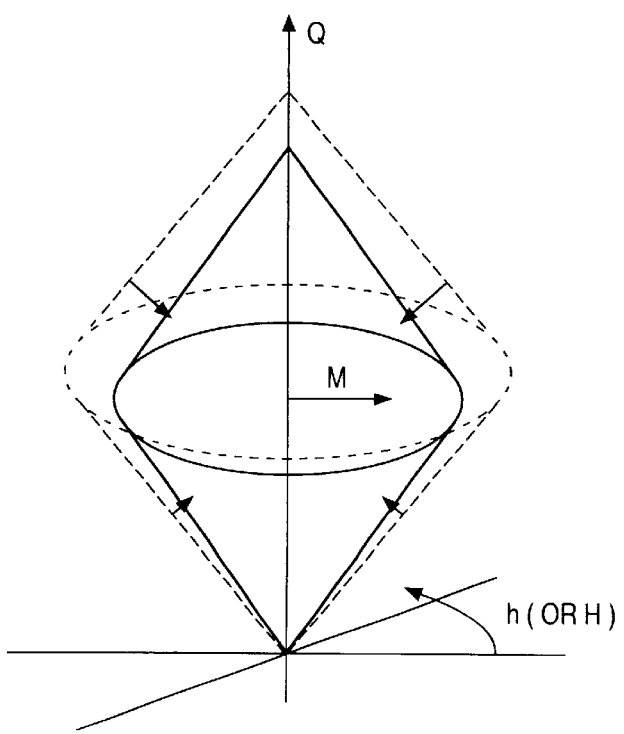

FIGS. 10A and 10B are conceptual views of the gamut mapping performed between different devices. In the drawings, the broken lines indicate a color reproduction range of an input device, and the solid lines indicate a color reproduction range of an output device. In the JCH color perception space, the level of J (lightness) is normalized respectively by illuminant white points under the viewing conditions 1 and 2 (hereinafter referred to as "white point 1" and "white point 2"). Thus, J does not depend on the illuminance levels of the viewing conditions 1 and 2 (hereinafter referred to as "illuminance level 1" and "illuminance level 2"). On the other hand, in the QMH color perception space, the level of Q (brightness) changes in accordance with the illuminance levels 1 and 2. Therefore, in the relative color matching, the white point 1 becomes the white point 2. Meanwhile in the absolute color matching, if illuminance level 1>illuminance level 2, the white point 1 is mapped to the white point 2. If illuminance level 1<illuminance level 2, the white point 1 is outputted in gray color because the white point 1 is lower than white point 2.

[Generating Data Dependent on Viewing Condition 2]

Next, the conversion LUT 16 is generated by the data generation portion 47.

Figure 11:
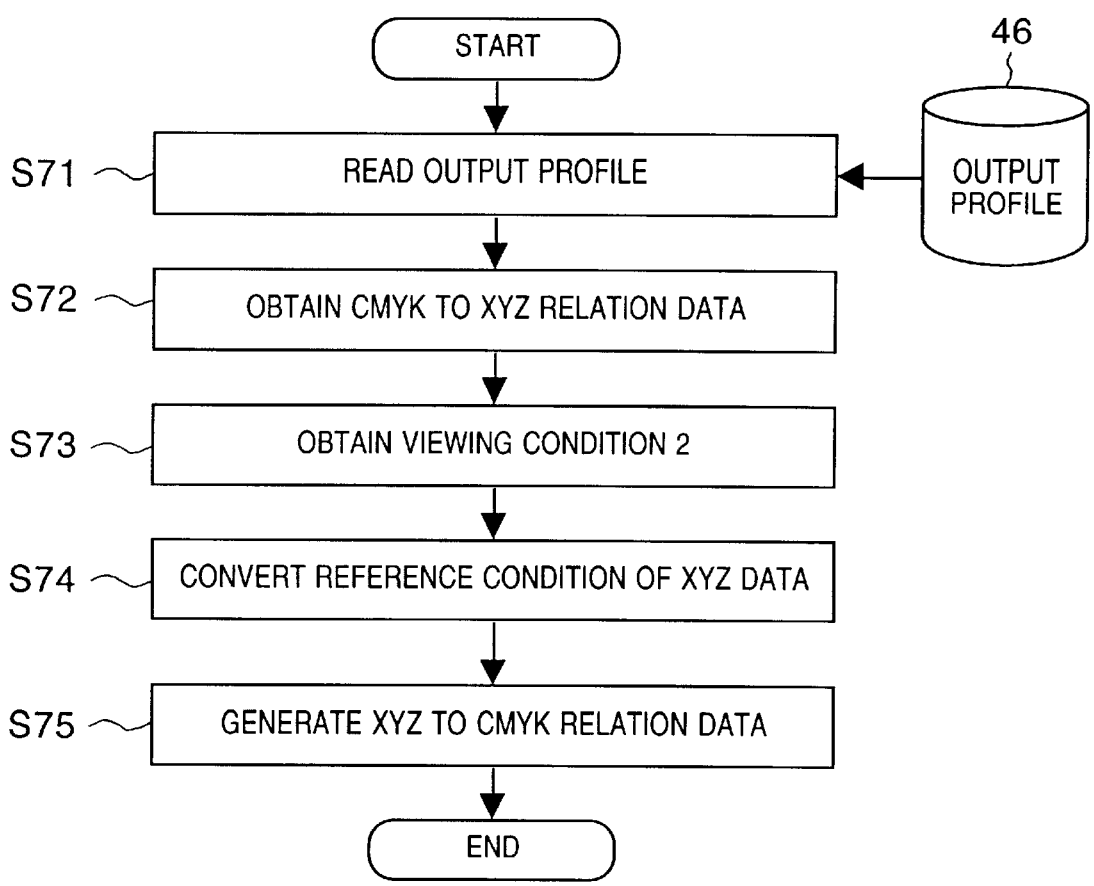
FIG. 11 is a flowchart showing the process of reconstructing a conversion LUT which corresponds to ambient light.

FIG. 11 is a flowchart showing the process of reconstructing the conversion LUT 16 (FIG. 2) which corresponds to ambient light.

Generally in the ICC profile for an output device, a LUT (BtoA0 Tag or the like) for converting XYZ or Lab values to device CMYK or RGB values is stored in the form including information of the gamut mapping. However, since the XYZ values inputted to the LUT employ D50 or D65 as a reference, the XYZ values cannot be directly used as a conversion LUT which corresponds to ambient light.

In a manner similar to that of gamut mapping processing, a conversion LUT (AtoB0 Tag or the like) for performing CMYK-to-XYZ conversion is read from the output profile 46 in step S71, and CMYK-to-XYZ relation data is obtained from the conversion LUT in step S72. Note that CMYK values of the CMYK-to-XYZ relation data may be other device-dependent colors such as RGB values or the like, and XYZ values may be other device-independent colors such as Lab values or the like. In step S73, the viewing condition 2 is obtained from the output profile 46 which stores the viewing condition 2 in advance.

The XYZ values of the obtained CMYK-to-XYZ relation data employ D50 or D65 as a reference. Therefore, the XYZ values of the colorimetric illuminant reference must be corrected to XYZ values of an ambient light reference in step S74. More specifically, by using the color perception model, the XYZ values of the colorimetric illuminant reference are converted to the color perception space JCH based on a calorimetric condition, i.e., the white point of D50 illuminant, an illuminance level, and the state of ambient light, and then the converted values in the color perception space JCH are converted back to XYZ values based on the viewing condition 2 different from the calorimetric condition, e.g., the white point of D65 illuminant, an illuminance level, and the state of ambient light. By this, XYZ values of the ambient light reference are obtained. In the foregoing manner, the relation between the device CMYK values and XYZ values of the ambient light reference is obtained. In step S75, ambient light XYZ-to-CMYK relation data is optimized by repetition or the like, using the CMYK-to-ambient-light-XYZ relation data, thereby obtaining the conversion LUT 16 which corresponds to a desired ambient light.

[Executing Color Matching]

Figure 12:
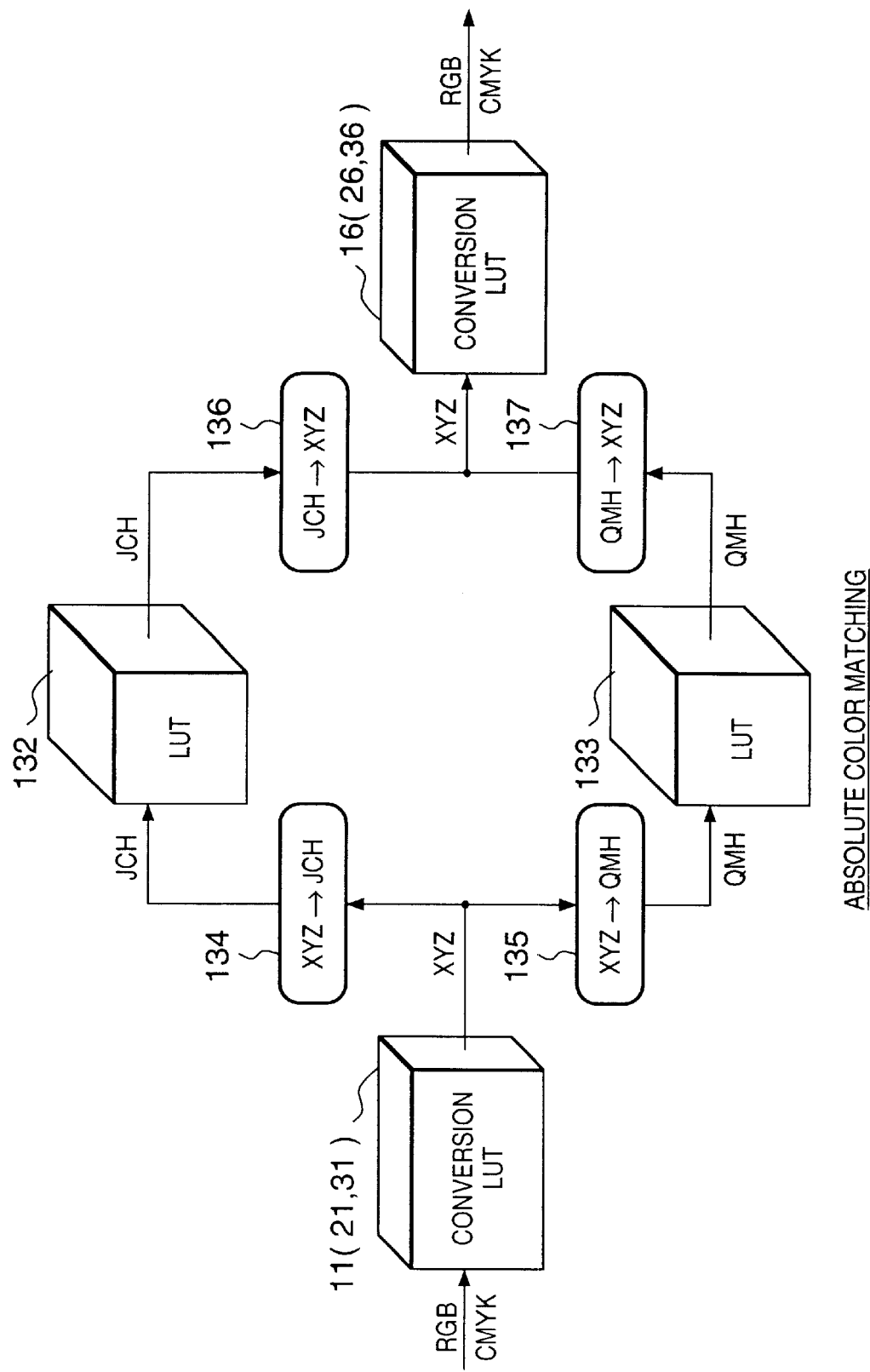
FIG. 12 is a conceptual view of color matching processing.

FIG. 12 is a conceptual view of color matching processing. Reference numeral 11 denotes a conversion LUT generated based on the viewing condition 1 by the data generation portion 41 (FIG. 3); 132, a LUT generated in the JCH color space by the gamut mapping portion 44; 133, a LUT generated in QMH color space by the gamut mapping portion 45; and 16, a conversion LUT generated based on the viewing condition 2 by the data generation portion 47.

RGB or CMYK input color signals are converted by the conversion LUT 11 from the input-device-dependent color signals to XYZ signals which are device-independent signals under the viewing condition 1. Next, the XYZ signals are converted by color perception model forward converters 134 and 135 to perception signals JCH or QMH, based on the viewing condition 1, such as the white point of D50 illuminant, an illuminance level, and the state of ambient light. In a case of relative color matching, JCH space is selected, while in a case of absolute color matching, QMH space is selected.

The color perception signals JCH and QMH are mapped to a color reproduction range of the output device by the LUT 132 and 133. The color perception signals JCH and QMH, where the gamut mapping has been performed, are converted by color perception model inverse converters 136 and 137 to XYZ signals which are device-independent signals under the viewing condition 2, based on the viewing condition 2, such as the white point of D65 illuminant, an illuminance level, and the state of ambient light. Then, XYZ signals are converted to output-device-dependent color signals under the viewing condition 2 by the conversion LUT 134.

The RGB or CMYK signals obtained by the above processing are sent to the output device, and an image represented by the color signals is printed. When the printout is viewed under the viewing condition 2, the colors of the printout are perceived as the same as the original document viewed under the viewing condition 1.

Second Embodiment

When viewing a monitor screen, human vision attempts to adapt to the monitor's white point, but sometimes cannot completely adapt. The following two causes are probable.

The first cause is incomplete adaptation. The larger the difference of the monitor's white point from the D65 illuminant and the lower the luminance at the adaptation point, the adaptation becomes incomplete. Correction of the incomplete adaptation is taken into consideration in the CIE CAM97a, and performed in step S110 in FIG. 17 during forward conversion.

According to CIE CAM97s, a chromatic adaptability is defined by the following equation.

complete adaptation: D=1.0 no adaptation: D=0.0 incomplete adaptation:

$$D = F - \frac{F}{1 + 2La^{1/4} + La^2/300}$$

Herein, D indicates chromatic adaptability. F indicates a constant which varies in accordance with a viewing condition, wherein F is 1.0 in the average lightness and 0.9 in the dim or dark condition. La indicates a luminance in the viewing subject. The chromatic adaptability D can be set independently for the input side and output side.

The second cause is partial adaptation. When a color temperature of a monitor's white point and a color temperature of ambient light largely differ, human vision partially adapts to both. Correction of the partial adaptation is not taken into consideration in the CIE CAM97a.

Partial adaptation is a state in which plural adapted states for plural illuminants are mixed. For instance, in a case of viewing an image displayed on a monitor having a predetermined white point under an illuminant having a different color temperature, the human vision adapts to both the monitor's white point and the illuminant's white point.

According to the present embodiment, in a case where a monitor is set as an output device, thus resulting in partial adaptation, RwGwBw obtained from Xw'Yw'Zw' indicative of an illuminant's white point, which is used in inverse conversion, is obtained as follows.

First, a cone response for an ambient light's white point and a cone response for a monitor's white point are obtained, utilizing the Bradford's basic spectral sensitivity. Assuming that XYZ values of the ambient light's white are XwaYwaZwa and XYZ values of the monitor's white are XwcYwcZwc (corresponding to Xw'Yw'Zw'), the cone response RwaGwaBwa for the ambient light's white and cone response RwcGwcBwc for the monitor's white are determined by the following equation:

$$\begin{bmatrix} Rwa \\ Gwa \\ Bwa \end{bmatrix} = \begin{bmatrix} 0.8591 & 0.2664 & -0.1614 \\ -0.7502 & 1.7135 & 0.0367 \\ 0.0389 & -0.0685 & 1.0296 \end{bmatrix} \begin{bmatrix} Xwa/Ywa \\ Ywa/Ywa \\ Zwa/Ywa \end{bmatrix} \quad (7)$$

$$\begin{bmatrix} Rwc \\ Gwc \\ Bwc \end{bmatrix} = \begin{bmatrix} 0.8591 & 0.2664 & -0.1614 \\ -0.7502 & 1.7135 & 0.0367 \\ 0.0389 & -0.0685 & 1.0296 \end{bmatrix} \begin{bmatrix} Xwc/Ywc \\ Ywc/Ywc \\ Zwc/Ywc \end{bmatrix} \quad (8)$$

Assuming that the partial adaptation coefficient is $\alpha$ and human vision is adapted 100% to the monitor when $\alpha=1$, the cone response RwcGwcBwc for a monitor's white which takes the partial adaptation into consideration is determined by the following equation:

$$\begin{aligned} Rwc' &= \alpha \cdot Rwc + (1-\alpha)Rwa \\ Gwc' &= \alpha \cdot Gwc + (1-\alpha)Gwa \\ Bwc' &= \alpha \cdot Bwc + (1-\alpha)Bwa \end{aligned} \quad (9)$$

Note that in the present embodiment, $\alpha$ is set to a default value 0.7 which has been obtained by an experiment.

In the foregoing manner, by performing chromatic adaptability processing which not only takes incomplete adaptation into consideration but also takes partial adaptation into consideration, an excellent output image can be obtained regardless of any viewing conditions and output devices.

Figure 13:
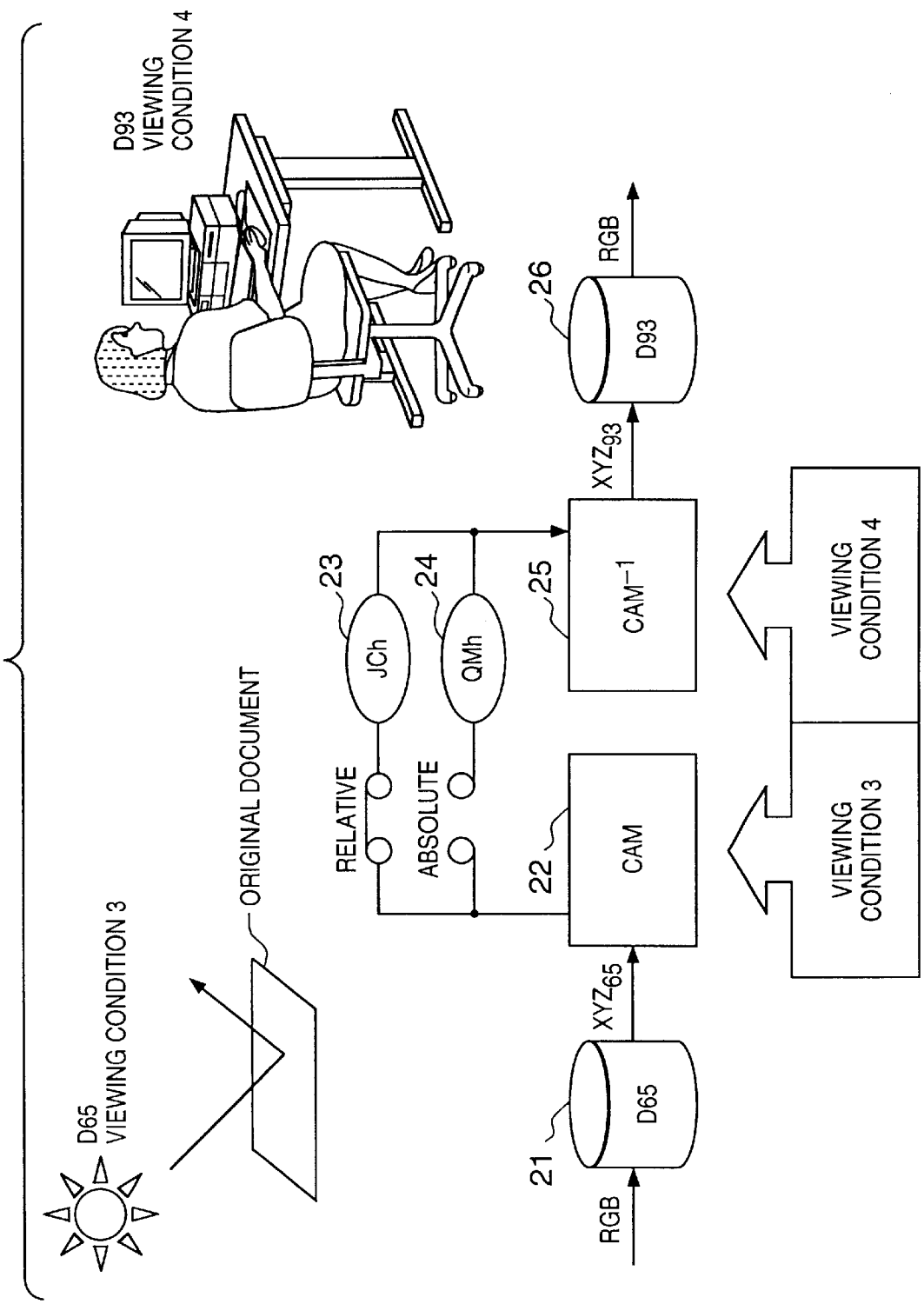
FIG. 13 is a conceptual view of color matching according to a second embodiment of the present invention.

Hereinafter, an example of color matching utilizing an input profile and monitor profile shown in FIG. 13 is described. Note that the construction and processing similar to that of the first embodiment will not be described in detail.

[Generating Data Dependent on Viewing Condition 1]

A conversion LUT 21 shown in FIG. 13 is generated by the data generation portion 41 according to the same method as that described in the first embodiment, i.e., the processing shown in FIGS. 4 and 5.

[Selecting Gamut Mapping Mode and Performing Gamut Mapping]

Since the selection of a gamut mapping mode is performed in the same manner as that of the first embodiment, a detailed description will not be provided.

Figure 14:
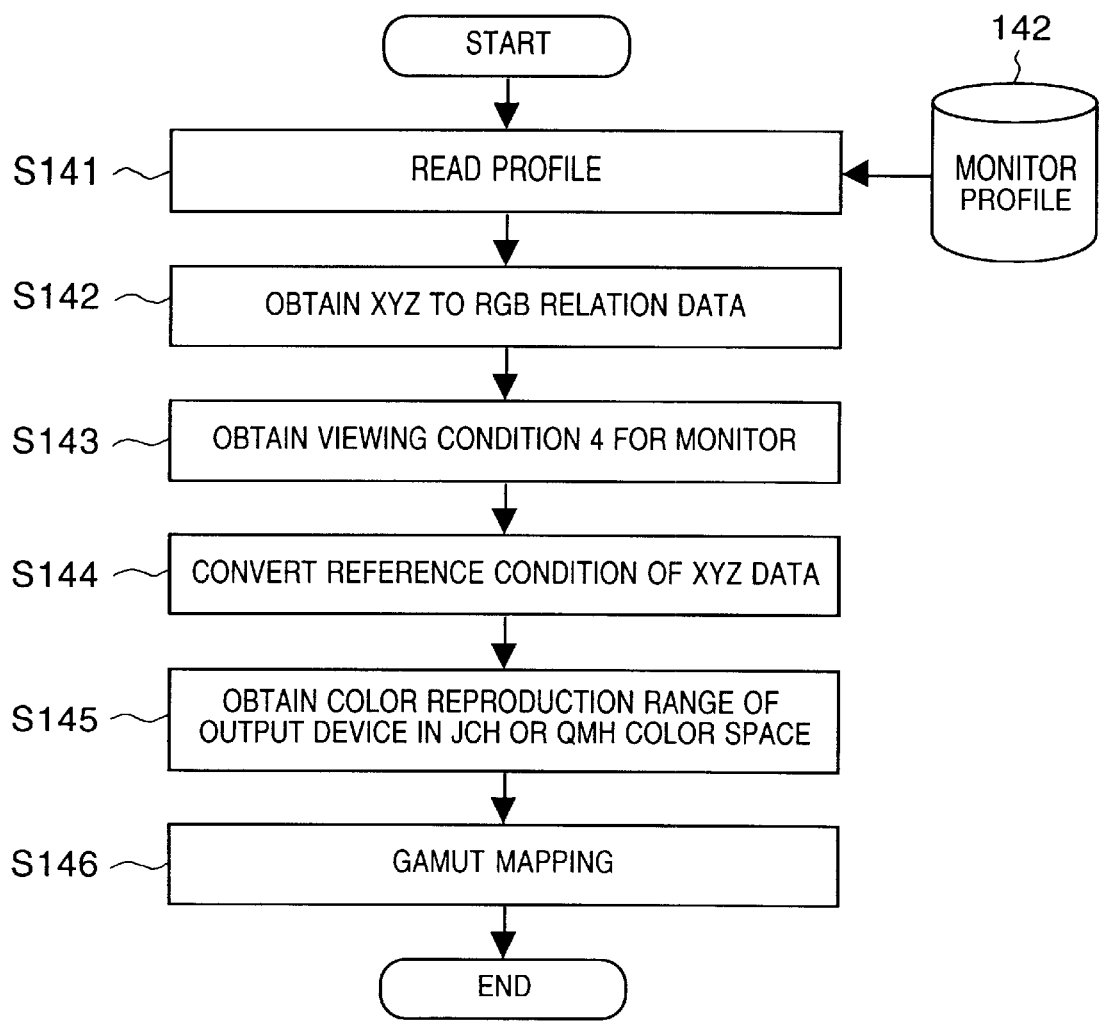
FIG. 14 is a flowchart showing the process of performing gamut mapping in the color space JCH or QMH according to the second embodiment.

FIG. 14 is a flowchart showing the process of performing the gamut mapping in the color perception space JCH 23 or color perception space QMH 24 shown in FIG. 13.

To perform the gamut mapping in a color perception space, a profile designated by a user is read from a monitor profile 142 in step S141.

Generally, in the ICC profile for a monitor device, a judgment LUT (gamut Tag), to which XYZ values or Lab values are inputted, is often stored in order to make inside/outside judgement of the color reproduction range. However, because the XYZ values employ D50 or D65 which is the characteristic of the colorimetric illuminant as a reference, the XYZ values cannot be directly used to make judgment of being inside/outside the color reproduction range according to ambient light. Therefore, instead of using the judgment LUT (gamut Tag) which judges being inside/outside the color reproduction range, RGB-to-XYZ relation data is obtained in step S142 from a conversion matrix (colorant Tag) or conversion LUT (AtoB0 Tag or the like), stored in the profile for RGB-to-XYZ conversion. Since the monitor profile includes a monitor viewing condition 4, the viewing condition 4 is obtained from the monitor id profile in step S143. Note that XYZ values of the RGB-to-XYZ relation data may be other device-independent color values such as Lab values.

The XYZ values of the RGB-to-XYZ relation data, obtained in step S142, employ D50 indicative of a calorimetric light, or a monitor's white point as a reference. Therefore, the XYZ values of the calorimetric illuminant reference must be corrected to XYZ values of an ambient light reference. In step S144, by using the color perception model, the XYZ values of the colorimetric illuminant reference are converted to the color perception space JCH based on a colorimetric condition, i.e., the white point of D50 illuminant, a luminance level, and the state of ambient light, and then the converted values in the color perception space JCH are converted back to XYZ values based on the viewing condition 4 different from the colorimetric condition, e.g., the white point of D93 illuminant, a luminance level, and the state of ambient light. By this, XYZ values of the ambient light reference are obtained. In the foregoing manner, the relation between the device RGB values and XYZ values of the ambient light reference is obtained. In step S145, a color reproduction range of a monitor device in the JCH or QMH color space is obtained.

The color reproduction range of a monitor device is obtained as follows. XYZ values of an ambient light reference on the following eight points, shown as an example, are obtained by the conversion processing of XYZ reference condition in step S144.

Red (R:255, G:0, B:0)
Yellow (R:255, G:255, B:0)
Green (R:0, G:255, B:0)
Cyan (R:0, G:255, B:255)
Blue (R:0, G:0, B:255)
Magenta (R:255, G:0, B:255)
White (R:255, G:255, B:255)
Black (R:0, G:0, B:0)

Then, the obtained XYZ values are converted to coordinate values in the color perception space JCH or QMH based on the viewing condition 4 by using the color perception model. By this, the color reproduction range of the monitor device can be approximated by a dodecahedron shown in FIG. 7.

In the color reproduction range approximated by the dodecahedron, for instance, if an intermediate point between White and Black on an achromatic color axis and a point represented by JCH values or QMH values of an input color signal subjected to an inside/outside judgment exist in the same side, it is judged that the input color signal is inside the color reproduction range, while if these points exist in the opposite sides, it is judged that the input color signal is outside the color reproduction range.

Based on the result of the inside/outside judgment of the color reproduction range in step S145, the gamut mapping is performed in step S146. FIGS. 8A and 8B are conceptual views of the gamut mapping in the JCH color perception space. FIGS. 9A and 9B are conceptual views of the gamut mapping in the QMH color perception space. If an input color signal is judged as being outside the color reproduction range of the output device in the aforementioned inside/outside judgment, the input color signal is mapped in the color reproduction range such that a hue angle h (or H) is preserved in the JCH color perception space or QMH color perception space. The color reproduction range obtained in step S146 is stored in the LUT for the JCH color perception space in a case of relative color matching, or stored in the LUT for the QMH color perception space in a case of absolute color matching.

FIGS. 10A and 10B are conceptual views of the gamut mapping performed between different devices. In the drawings, the broken lines indicate a color reproduction range of an input device, and the solid lines indicate a color reproduction range of an output device. In the JCH color perception space, the level of J (lightness) is normalized respectively by illuminant white points under the viewing conditions 1 and 4 (hereinafter referred to as "white point 1" and "white point 4"). Thus, J does not depend on the illuminance level of the viewing condition 1 and luminance level of the viewing condition 4 (hereinafter referred to as "illuminance level 1" and "luminance level 4"). On the other hand, in the QMH color perception space, the level of Q (brightness) changes in accordance with the illuminance level 1 and luminance level 4. Therefore, in the relative color matching, the white point 1 becomes the white point 4. Meanwhile in the absolute color matching, if illuminance level 1>luminance level 4, the white point 1 is mapped to the white point 4. If illuminance level 1<luminance level 4, the white point 1 is outputted in gray color because the white point 1 is lower than white point 4.

[Generating Data Dependent on Viewing Condition 4]

Next, the conversion LUT 26 shown in FIG. 13 is generated by the data generation portion 47.

Figure 15:
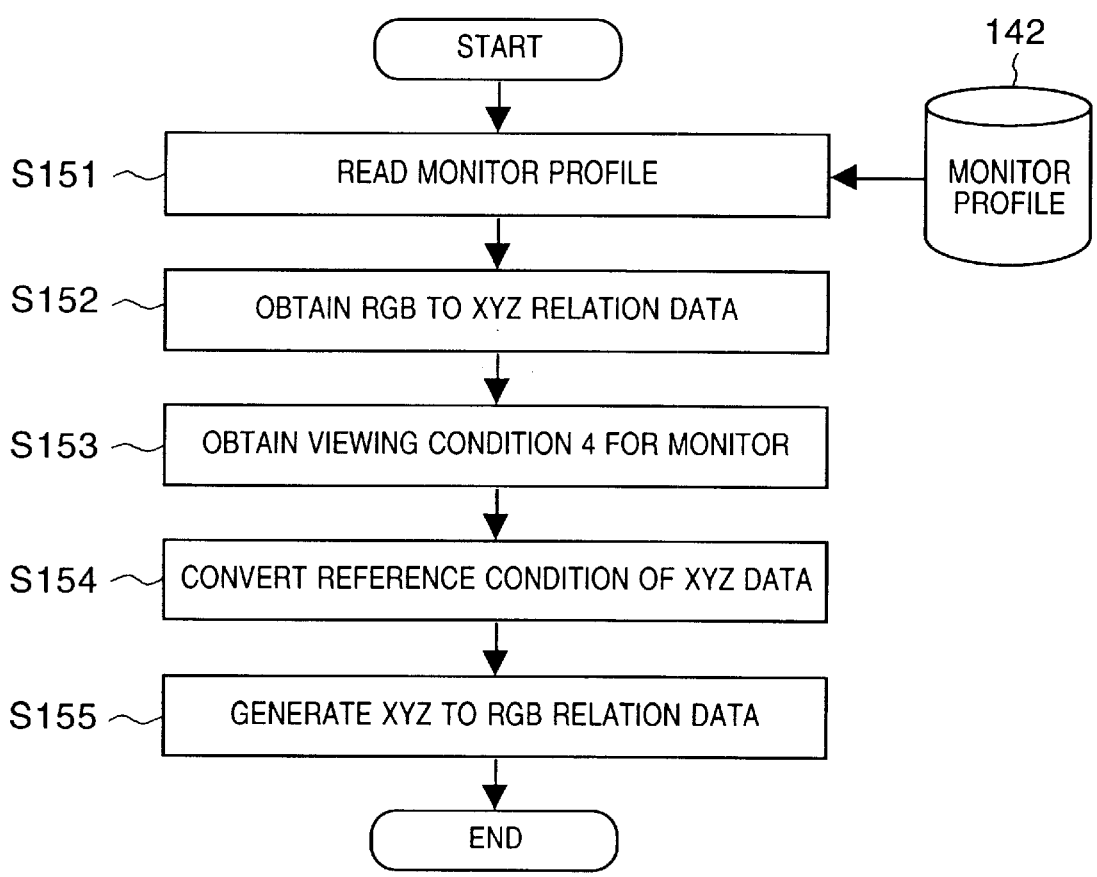
FIG. 15 is a flowchart showing the process of reconstructing a conversion LUT which corresponds to ambient light according to the second embodiment.

FIG. 15 is a flowchart showing the process of reconstructing the conversion LUT 26 which corresponds to ambient light.

In the ICC profile for a monitor device, there are cases in which a LUT (BtoA0 Tag or the like) for converting XYZ to device RGB values is stored in the form including information of the gamut mapping. However, since the XYZ values inputted to the LUT employ D50 or D65 as a reference, the XYZ values cannot be directly used as a conversion LUT which corresponds to an ambient light.

In a manner similar to that of gamut mapping processing, a conversion matrix (colorant Tag) or a conversion LUT (AtoB0 Tag or the like) for performing RGB-to-XYZ conversion is read from the monitor profile 142 in step S151, and RGB-to-XYZ relation data is obtained from the conversion LUT in step S152. Note that XYZ values of the RGB-to-XYZ relation data may be other device-independent color values, such as Lab values or the like. In step S153, the viewing condition 4 is obtained from the monitor profile 142 which stores the viewing condition 4 in advance.

The XYZ values of the obtained RGB-to-XYZ relation data employ D50 or monitor's white point as a reference. Therefore, the XYZ values of the colorimetric illuminant reference must be corrected to XYZ values of an ambient light reference in step S154. More specifically, by using the color perception model, the XYZ values of the calorimetric illuminant reference are converted to the color perception space JCH based on a calorimetric condition (the white point of D50 illuminant, a luminance level, and the state of ambient light), and then the converted values in the color perception space JCH are converted back to XYZ values based on the viewing condition 4 (the white point of D93 illuminant, a luminance level, and the state of ambient light) which is different from the colorimetric condition. By this, XYZ values of the colorimetric illuminant reference are converted to XYZ values of the ambient light reference. In the foregoing manner, the relation between the device RGB values and XYZ values of the ambient light reference is obtained. In step S155, the RGB-to-XYZ conversion is formulated into a model such as a conversion matrix and optimized by repetition or the like, thereby obtaining the conversion LUT 26 which corresponds to a desired ambient light.

[Executing Color Matching]

FIG. 12 is a conceptual view of color matching processing. Reference numeral 21 denotes a conversion LUT generated based on the viewing condition 1 by the data generation portion 41; 132, a LUT generated in the JCH color space by the gamut mapping portion 44; 133, a LUT generated in QMH color space by the gamut mapping portion 45; and 26, a conversion LUT generated based on the viewing condition 4 by the data generation portion 47.

RGB input color signals are converted by the conversion LUT 21 from the input-device-dependent color signals to XYZ signals which are device-independent signals under the viewing condition 1. Next, the XYZ signals are converted by color perception model forward converters 134 and 135 to perception signals JCH or QMH, based on the viewing condition 1, such as the white point of D50 illuminant, an illuminance level, and the state of ambient light. In a case of relative color matching, JCH space is selected, while in a case of absolute color matching, QMH space is selected.

The color perception signals JCH and QMH are mapped to a color reproduction range of the monitor device by the LUT 132 and 133. The color perception signals JCH and QMH, where the gamut mapping has been performed, are converted by color perception model inverse converters 136 and 137 to XYZ signals which are device-independent signals under the viewing condition 4, based on the viewing condition 4, such as the white point of D93 illuminant, a luminance level, and the state of ambient light. Then, XYZ signals are converted to monitor-device-dependent color signals under the viewing condition 4 by the conversion LUT 26.

The RGB signals obtained by the above processing are sent to the monitor device, and an image represented by the color signals is displayed on the monitor device. When the displayed image is viewed under the viewing condition 4, the colors of the displayed image are perceived as the same as the original document viewed under the viewing condition 1.

As a typical example of using a monitor as an output device besides those described above, an image to be outputted by a printer is previewed on the monitor. In this case, image data upon which color matching is performed between an input device and a printer is subjected to color matching between the printer and monitor. When correction of partial adaptation (hereinafter referred to as partial adaptation processing) is performed not in the color matching processing between the input device and printer, but in the color matching processing between the printer and monitor, the partial adaptation processing similar to the above-described embodiments may be performed. By this, an excellent preview is displayed while taking into consideration partial adaptation.

According to each of the above-described embodiments, the following effects are achieved.

(1) Different viewing conditions (white point of ambient light, illumination level and so on) can be set for each of the image data source side and the image data destination side. By this, for instance, color reproduction in an environment of a remote place connected by a network can be simulated.

(2) XYZ values employing ambient light in the image data source side as a reference are converted by a human color perception model to the JCH color space or QMH color space based on a viewing condition of the image data source side (white point of an ambient light, illumination level and so on), and then converted back to XYZ values employing ambient light in the image data destination side as a reference, based on a viewing condition of the image data destination side (white point of an ambient light, illumination level and so on). By this, color matching can be performed with independent setting of viewing conditions of the image data source side and image data destination side.

(3) Gamut mapping is performed in the QMH (or JCH) color space, which is the human color perception space. By virtue of this, human color perception characteristics, such as the contour lines of hue, can be reflected upon the gamut mapping, and color matching most appropriate for the ambient light can be performed.

(4) Color matching can be selected from two modes: absolute color matching where the gamut mapping is performed in QMH color space, and relative color matching where the gamut mapping is performed in JCH color space. By virtue of this, it is possible to attempt color matching which is as absolute as possible in the color reproduction range of the output device, or attempt relative color matching which takes the best advantage of the dynamic range of the color reproduction range of the output device, thereby performing color matching most appropriate for the color reproduction range of the output device.

(5) Colorimetric values (XYZ or Lab values) of a color target of color patch are converted to values in the JCH color space by a human color perception model based on a colorimetric condition (white point of a colorimetric illuminant or illumination level and so on), and then converted back to XYZ (or Lab) values based on a viewing condition (white point of an ambient light and illumination level and so on). By this, XYZ values employing the calorimetric illuminant as a reference are converted to XYZ values employing ambient light as a reference.

(6) Data indicative of a relation between device-independent data, obtained by colorimetry of a color target under a standard illuminant, and device-dependent data, which is dependent on a device into which the color target data is inputted, is stored in an input profile. In accordance with a viewing condition (white point of an ambient light, illumination level and so on) at the time of viewing an image to be inputted, a conversion matrix or a conversion LUT for converting device-dependent data to device-independent data is dynamically generated. By this, color matching corresponding to the ambient light at the time of viewing the image to be inputted can be performed. Furthermore, the conversion matrix or conversion LUT for converting device-dependent data stored in the input profile to device-independent data (standard illuminant reference) is dynamically updated in accordance with a viewing condition at the time of viewing the image to be inputted (white point of an ambient light, illumination level and so on). By this, color matching corresponding to the ambient light at the time of viewing the image to be inputted can be performed.

(7) A conversion matrix or a conversion LUT for converting device-dependent data stored in a monitor profile to device-independent data (white point reference of a monitor or standard illuminant reference) is dynamically updated in accordance with a viewing condition of a monitor (white point of an ambient light, luminance level and so on). By this, color matching corresponding to an ambient light of a monitor can be performed.

(8) Data indicative of a relation between device-dependent data of a color patch and device-independent data obtained by colorimetry of a printout of the color patch under a standard illuminant, is stored in an output profile. In accordance with a viewing condition (white point of an ambient light, illumination level and so on) at the time of viewing the printout, a conversion LUT for converting device-independent data to device-dependent data is dynamically generated. By this, color matching corresponding to an ambient light at the time of viewing an output original can be performed.

Third Embodiment

Described in a third embodiment is an example of a Graphic User Interface (GUI) for manually setting a viewing condition (e.g., viewing condition 1 or 2 in FIG. 2) for each of the foregoing embodiments.

FIG. 19 shows a GUI 191 for setting a parameter of a viewing condition according to the third embodiment.

Reference numeral 213 denotes a drop-down combo-box for setting a viewing subject on the input side (i.e., input device); 217, a drop-down combo-box for setting a viewing subject on the output side (i.e., output device); 214, a text box for inputting a luminance of a viewing subject on the input side; 215, a drop-down combo-box for selecting the type of white point in the viewing subject on the input side; 216, a drop-down combo-box for selecting a viewing condition on the input side; 218, a text box for inputting a luminance of a viewing subject on the output side; 219, a drop-down combo-box for selecting a white point in the viewing subject on the output side; and 2110, a drop-down combo-box for selecting a viewing condition on the output side.

Note that the luminance relates to the luminance LA or LA' according to the CIE CAM97s; an illuminant relates to XwYwZw or Xw'Yw'Zw'; and an ambient light relates to the constant c or c', coefficient Nc or Nc', lightness contrast coefficient FLL or FLL' and adaptability coefficient F or F'.

Normally, about 20% of a white point is inputted as a luminance of a viewing subject. To obtain the type of white point in the viewing subject, XYZ values of a white point in the viewing subject are necessary. However, for a simple explanation, it is assumed herein that the reflectivity of a white point in the medium used is 100%, and therefore, a white point of an illuminant is used herein. Furthermore, although it is better to utilize a white point of the illuminant under the actual viewing condition, it is assumed herein that a standard illuminant type is selected. As the type of standard illuminant, there are illuminants A, C, D65, D50, D93, F2, F8, and F11. Since an image is the viewing subject herein, a relative luminance of the background is assumed to be 20%. With respect to the viewing condition, if the ambient relative luminance is equal to or larger than 20%, which has been assumed as the background relative luminance, the subject is determined as "average lightness". If the ambient relative luminance is less than 20%, the subject is determined as "dim". If the ambient relative luminance is almost 0%, the subject is determined as "dark".

According to the third embodiment, the coefficient α used in partial adaptation processing can be manually adjusted in chromatic adaptability adjustment. As mentioned above, the coefficient α is set to a default value of 0.7, which has been obtained by an experiment. However, depending on the environmental condition and a user's visual characteristics, a value other than the default value of 0.7 may be set for the coefficient α. Thus, according to the third embodiment, the coefficient α is made manually adjustable to improve color reproducibility.

As shown in FIG. 19, the value of coefficient α can be set in the range of 0 to 1 in a text box 2111. For complete adaptation, 1 is set. As mentioned above, since partial adaptation occurs when using a monitor as an output device, the coefficient α is made adjustable in the text box 2111 only in a case where a monitor is selected as an output device (i.e., viewing subject on the output side). On the other hand, if a device other than a monitor, e.g., a printer or the like, is selected as an output device, the coefficient α is set to 1, disabling the coefficient adjustment by the user. For instance, the text box 2111 is colored with-the background color to let the user know that the coefficient is not adjustable. By this, it is possible to prevent an erroneous adjustment operation by a user.

Note that in the third embodiment, although only the coefficient α related to the partial adaptation processing is made adjustable in chromatic adaptability adjustment, the coefficient D related to incomplete adaptation may be made adjustable. By this, chromatic adaptability can be adjusted more finely. In this case, to enable a user to perform easy adjustment, a plurality of images supposedly obtained in a case where the coefficients α and D are changed to various values are displayed in one screen, and a user selects a desired image, thus selecting the coefficients α and D. By virtue of this, even if a user does not have knowledge regarding chromatic adaptation, the coefficients α and D can be readily adjusted.

According to the third embodiment, since chromatic adaptability adjustment can be readily performed, it is possible to obtain an excellent output image regardless of a viewing condition. Particularly, since a value obtained by an experiment is set as a default value in advance, the burden of a user for performing adjustment can be reduced compared to the case where adjustment is performed from zero.

Note that although the present invention employs CIE CAM97s shown in FIGS. 17 and 18 in the processing suitable to the viewing condition, the present invention is not limited to this, but may employ other processing methods.

Furthermore, the partial adaptation processing which is not considered in the CIE CAM97s may be substituted with other processing methods. For instance, in the third embodiment, weight values for a monitor and ambient light are set so as to become 1. However, it may be so set that the sum of the weight values changes in accordance with a viewing condition, e.g., ambient light. Furthermore, the coefficients can be independently set for ambient light and a monitor.

The present invention can be applied to a system constituted by a plurality of devices (e.g., host computer, interface, reader, printer) or to an apparatus comprising a single device (e.g., copying machine, facsimile machine).

Further, the object of the present invention can also be achieved by providing a storage medium storing program codes for performing the aforesaid processes in a computer system or apparatus (e.g., a personal computer), reading the program codes, by a CPU or MPU of the computer system or apparatus, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides a case in which the aforesaid functions according to the above embodiments are realized by executing the program codes which are read by a computer, the present invention includes a case where an OS (operating system) or the like working on the computer performs a part of or the entire process in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, a CPU or the like contained in the function expansion card or unit performs a part of or the entire process in accordance with designations of the program codes and realizes functions of the above embodiments.

The present invention is not limited to the above embodiments and various changes and modifications can be made within the spirit and scope of the present invention. Therefore, to apprise the public of the scope of the present invention, the following claims are made.

What is claimed is:

1. An image processing method of outputting an image, on which a color conversion process in accordance with input and output image viewing conditions is performed by using a color perception model, to a monitor, comprising the steps of:

performing forward conversion processing of the color perception model on input image data to convert the input image data into a color perception space;

performing inverse conversion processing of the color perception model on the input image data in the color perception space, wherein the inverse conversion processing includes partial adaptation processing in accordance with white of ambient light and white of the monitor which are included in the output image viewing condition; and inputting a user instruction, by using a graphical user interface, to independently adjust the input image viewing condition, the output image viewing condition and a condition used in the partial adaptation processing.

2. The method according to claim 1, wherein the forward conversion processing performs incomplete adaptation processing in accordance with the input image viewing condition, and the inverse conversion processing performs incomplete adaptation processing in accordance with the output image viewing condition.

3. The method according to claim 1, wherein a ratio of the white of the ambient light to the white of the monitor is set to three to seven as a coefficient of the partial adaptation processing, in advance.

4. The method according to claim 1, wherein the color conversion process is performed with a color matching process between an image inputting device and an image outputting device.

5. The method according to claim 4, further comprising the steps of:

converting the input image data in accordance with a profile according to the image inputting device;

performing the color conversion process on the converted image data; and converting the image data, on which the color conversion process is performed, in accordance with a profile according to the image outputting device.

6. The method according to claim 1, further comprising the step of disabling, if a device except the monitor is selected as an image outputting device, the adjustment of the condition used in the partial adaptation processing.

7. The method according to claim 1, further comprising the steps of:

converting the input image data depended on an image inputting device into a color space which is independent of devices; and converting the converted image data into a color space depended on the monitor.

8. The method according to claim 7, further comprising the step of dynamically generating a converting condition used in said converting steps by using the color perception model.

9. A computer readable medium comprising computer program codes, for a method of outputting an image, on which a color conversion process in accordance with input and output image viewing conditions is performed by using a color perception model, to a monitor, comprising process procedure code for:

performing forward conversion processing of the color perception model on input image data to convert the input image data into a color perception space;

performing inverse conversion processing of the color perception model on the input image data in the color perception space, wherein the inverse conversion processing includes partial adaptation processing in accordance with white of ambient light and white of the monitor which are included in the output image viewing condition; and inputting a user instruction, by using a graphical user interface, to independently adjust the input image viewing condition, the output image viewing condition and a condition used in the partial adaptation processing.

10. A computer program product comprising computer program codes, for a method of outputting an image, on which a color conversion process in accordance with input and output image viewing conditions is performed by using a color perception model, to a monitor, comprising process procedure code for:

performing forward conversion processing of the color perception model on input image data to convert the input image data into a color perception space;

performing inverse conversion processing of the color perception model on the input image data in the color perception space, wherein the inverse conversion processing includes partial adaptation processing in accordance with white of ambient light and white of the monitor which are included in the output image viewing condition; and inputting a user instruction, by using a graphical user interface, to independently adjust the input image viewing condition, the output image viewing condition and a condition used in the partial adaptation processing.

11. An image processing apparatus for outputting an image, on which a color conversion process in accordance with input and output image viewing conditions is performed by using a color perception model, to a monitor, said apparatus comprising:

a first converter, arranged to perform forward conversion processing of the color perception model on input image data to convert the input image data into a color perception space;

a second converter, arranged to perform inverse conversion processing of the color perception model on the input image data in the color perception space, wherein the inverse conversion processing includes partial adaptation processing in accordance with white of ambient light and white of the monitor which are included in the output image viewing condition; and a graphical user interface, arranged to input a user instruction to independently adjust the input image viewing condition, the output image viewing condition and a condition used in the partial adaptation processing.

* * * * *

UNITED STATES PATENT AND TRADEMARK OFFICE
CERTIFICATE OF CORRECTION

PATENT NO.   : 6,459,436 B1
DATED        : October 1, 2002
INVENTOR(S)  : Shuichi Kumada et al.

It is certified that error appears in the above-identified patent and that said Letters Patent is hereby corrected as shown below:

Column 4,
Line 24, "detail-with" should read -- detail with --.

Column 5,
Line 59, "X'Y'z'" should read -- X'Y'Z' --.

Column 8,
Line 37, "The." should read -- The --.

Column 9,
Line 16, "calori-" should read -- colori- --.

Column 10,
Lines 20, 35 and 38, "calorimetric" should read -- colorimetric --.

Column 12,
Line 13, "calorimetric" should read -- colorimetric --.

Column 14,
Line 48, "id" should be deleted.

Column 16,
Lines 33 and 35, "calorimetric" should read -- colorimetric --.

Column 18,
Line 12, "calorimetric" should read -- colorimetric --.

Signed and Sealed this

First Day of July, 2003

JAMES E. ROGAN
*Director of the United States Patent and Trademark Office*